US008456489B2

(12) United States Patent
Matsumoto et al.

(10) Patent No.: US 8,456,489 B2

(45) Date of Patent: Jun. 4, 2013

(54) METHOD OF DISPLAYING DOCUMENT WITH IMAGE

(75) Inventors: Kazumi Matsumoto, Tokyo (JP); Shotaro Tamayama, Funabashi (JP); Yukinobu Maruyama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 201 days.

(21) Appl. No.: 12/875,263

(22) Filed: Sep. 3, 2010

(65) Prior Publication Data

US 2011/0074812 A1 Mar. 31, 2011

(30) Foreign Application Priority Data

Sep. 30, 2009 (JP) ................................ 2009-228523

(51) Int. Cl.
*G09G 5/14* (2006.01)

(52) U.S. Cl.
USPC .......................................... 345/629; 345/619

(58) Field of Classification Search
None
See application file for complete search history.

(56) References Cited

U.S. PATENT DOCUMENTS

| | | | | |
|---|---|---|---|---|
| 5,822,539 | A * | 10/1998 | van Hoff | 709/236 |
| 5,880,740 | A * | 3/1999 | Halliday et al. | 345/629 |
| 6,054,990 | A * | 4/2000 | Tran | 715/863 |
| 6,859,909 | B1 * | 2/2005 | Lerner et al. | 715/203 |
| 7,493,559 | B1 * | 2/2009 | Wolff et al. | 715/727 |
| 2002/0054059 | A1 * | 5/2002 | Schneiderman | 345/700 |
| 2003/0146915 | A1 * | 8/2003 | Brook et al. | 345/473 |
| 2006/0061595 | A1 * | 3/2006 | Goede et al. | 345/619 |
| 2008/0136838 | A1 * | 6/2008 | Goede et al. | 345/619 |
| 2009/0160856 | A1 * | 6/2009 | Hoguet | 345/420 |

FOREIGN PATENT DOCUMENTS

| | | | |
|---|---|---|---|
| JP | 10-240911 | A | 9/1998 |
| JP | 11-025077 | A | 1/1999 |
| JP | 2000-105731 | A | 4/2000 |
| JP | 2002-108898 | A | 4/2002 |
| JP | 2004-199407 | A | 7/2004 |
| JP | 2007/058388 | A | 3/2007 |
| JP | 2009-169463 | A | 7/2009 |

OTHER PUBLICATIONS http://www.trustedreviews.com/opinions/adobe-photoshop-cs4-beta-preview_Page-2 Adobe Photoshop CS4—Beta Preview by Cliff Smith Sep. 29, 2008.*

* cited by examiner

*Primary Examiner* — James A Thompson
*Assistant Examiner* — Jason Pringle-Parker
(74) *Attorney, Agent, or Firm* — Mattingly & Malur, PC

(57) ABSTRACT

A method of displaying a document with an image. Tabs 35$_1$ to 35$_4$ associated with the same document are set on a document screen 33 of a document display screen 32, with one of the tabs (35$_1$) open. A base image 36 attached to the document is displayed on the tab 35$_1$. At the position for a comment, etc. of this base image, objects (added information) such as a comment 37, a pattern 38 related to the comment, a symbol 39 and an arrow 41 are added. These objects can be added by operating an "add" button 16*a* or an object select section 42. Also, an added object list screen 34 indicating a list of the objects added is displayed. The added information such as a comment added to the base image can be immediately viewed in the state related to the base image.

7 Claims, 15 Drawing Sheets

FIG. 3

SERVER DATA BASE 1b

USER MANAGEMENT TABLE 4a (4a1, 4a2, 4a3, 4a4, 4a5)

| FIELD NAME | userid | username | passwd | realname |
|---|---|---|---|---|
| APPLICATION/REMARK | UNIQUE ID | USER NAME | PASS WORD | DISPLAY NAME |
| EXAMPLE | 00001 | tama | himitsu | TAMAYAMA |

PROJECT MANAGEMENT TABLE 4b (4b1–4b10)

| FIELD NAME | projectid | title | code | remark | create_userid | create_datetime | modify_userid | modify_datetime | memberlist |
|---|---|---|---|---|---|---|---|---|---|
| APPLICATION/ REMARK | | PROJECT TITLE | MANAGE-MENT CODE | REMARK | AUTHOR USER ID | GENERATION DATE/HOUR | LAST UPDATE USER ID | LAST UPDATE DATE/HOUR | LIMITED USER LIST |
| EXAMPLE | 00006 | NEW IDEA MEETING | 20090825-01 | INSERT PHOTO SHOWING DISCUSSION | 00001 | 2009/08/25/ 10:18:23 | 00003 | 2009/08/26/11: 13:29 | 00001,00004,00009 |

DOCUMENT MANAGEMENT TABLE 4c (4c1–4c11)

| FIELD NAME | documentid | projectid | title | pict_xml | create_userid | create_datetime | modify_userid | modify_datetime | lock_userid | lock_datetime |
|---|---|---|---|---|---|---|---|---|---|---|
| APPLICATION/ REMARK | | ID OF PROJECT ASSOCIATED WITH DOCUMENT | TITLE | BASE IMAGE INFOR-MATION | AUTHOR USER ID | GENERATION DATE/HOUR | LAST UPDATE USER ID | LAST UPDATE DATE/HOUR | ID OF USER LOCK-ING DOCUMENT (FOR EDITING) | DOCUMENT LOCK STARTING DATE/HOUR |
| EXAMPLE | 00011 | 00006 | PHOTO1 | <Photo>123.img</Photo> | 00001 | 2009/08/25/ 10:18:23 | 00003 | 2009/08/25/11: 13:29 | 00003 | 2009/08/26/11:33:18 |

TAB (IN DOCUMENT) MANAGEMENT TABLE 4d (4d1, 4d2, 4d3, 4d4, 4dc5, 4dc6, 4d7)

| FIELD NAME | documentid | projectid | tabindex | caption | objectxml | searchtext |
|---|---|---|---|---|---|---|
| APPLICATION/ REMARK | ID OF DOCUMENT ASSOCIATED WITH TAB | ID OF PROJECT ASSOCIATED WITH TAB | IN-DOCU-MENT TAB POSITION | TAB CAPTION | IN-TAB PLOTTED OBJECT INFORMATION | CHARACTER STRING TO BE RETRIEVED FOR WHOLE DOCUMENT SEARCH |
| EXAMPLE | 00011 | 00006 | 1 | NEW TAB | <line /> <shape type="0"/> <tagtext> COMMENT CONTENT </tagtext> <line /> | SEARCH INFORMATION AVAILABLE HERE |

FIG. 4

<line> ··· LINE OBJECT
ATTRIBUTE
posx : ARRANGEMENT X COORDINATE
posy : ARRANGEMENT Y COORDINATE
draglocked : MOVE PROHIBIT FLAG
thickness : LINE THICKNESS
color : LINE COLOR
width : WIDTH (OF RECTANGLE WITH LINE AS DIAGONAL)
height : HEIGHT (OF RECTANGLE WITH LINE AS DIAGONAL)
alpha : LINE DISPLAY TRANSPARENCY
arrow : ARROW CLASS
0: NO ARROW
1: START POINT ARROW
2: END POINT ARROW
3: BOTH-END ARROW <shape> ··· PATTERN (RECTANGLE/ELLIPSE) OBJECT
ATTRIBUTE
posx : ARRANGEMENT X COORDINATE
posy : ARRANGEMENT Y COORDINATE
draglocked : MOVE PROHIBIT FLAG
type : PATTERN TYPE
0: RECTANGLE
1: ELLIPSE
width : WIDTH
height : HEIGHT
thickness : THICKNESS OF OUTER PERIPHERAL LINE
linecolor : COLOR OF OUTER PERIPHERAL LINE
fill : PAINT FLAG
fillColor : PAINT COLOR
fillAlpha : PAINT TRANSPARENCY <tagtext> ··· COMMENT OBJECT
ATTRIBUTE
posx : ARRANGEMENT X COORDINATE
posy : ARRANGEMENT Y COORDINATE
draglocked : MOVE PROHIBIT FLAG
fontface : FONT NAME
fontsize : CHARACTER SIZE
fontcolor : CHARACTER COLOR
fontbold : SOLID CHARACTER FLAG
tag : TAG DISPLAY FLAG
tagframecolor : TAG OUTER PERIPHERY COLOR
tagcolor : TAG PAINT COLOR
tagalpha : TAG PAINT TRANSPARENCY
edituser : LAST UPDATE USER NAME
url : THREADED URL
LOW-ORDER ELEMENT
(TEXT NODE) : COMMENT CHARACTER STRING <stamp> ··· SYMBOL/IMAGE OBJECT
ATTRIBUTE
posx : ARRANGEMENT X COORDINATE
posy : ARRANGEMENT Y COORDINATE
draglocked : MOVE PROHIBIT FLAG
preset : IMAGE TYPE
path : IMAGE HOLD PATH (IN SERVER)
scale : DISPLAY MAGNIFICATION
alpha : DISPLAY TRANSPARENCY

METHOD OF DISPLAYING DOCUMENT WITH IMAGE

CLAIM OF PRIORITY

The present application claims priority from Japanese patent application JP-A-2009-228523 filed on Sep. 30, 2009, the content of which is hereby incorporated by reference into this application.

BACKGROUND OF THE INVENTION

This invention relates to a method of displaying a document with an image of, for example, a photo or a memo of a meeting, or in particular, to a method of displaying a document with an image to which the information such as a comment, a symbol or a pattern can be added.

A conventional technique is known, wherein an image of a photo of a landscape or a person, a photo of a memo written on a blackboard at a meeting or a photo taken of a map (hereinafter referred to as "the base image") is held at the terminal of one user and accessed by and displayed on the terminal of another user, and wherein in order to give an opinion on this base image, for example, a comment is input at this terminal so that any user can acquire and display the base image and the comment.

In an example of this technique, a text, a table or a pattern is used as the base image, and the user displays the text, for example, and generates a comment required for the text, while at the same time designating, with a cursor or the like, the position at which the comment is added to the text. Then, the add position information and the comment are related to each other and registered in a comment file. Also, assume that the text is displayed and a predetermined position thereof designated. In the case where comments corresponding to the designated position are registered in the comment file, a list of the comments is read from the comment file and displayed, so that the desired one of the comments is selected by the user from the list and displayed on a display unit. As a result, the user, by designating the desired position in the text on display, can view the comment on the content of the text at the designated position thereof. Incidentally, any comment at the designated position of the text, which is not registered in the text file, is not read from the comment file and the process is ended (see, for example, JP-A-2002-108898).

According to the technique described in JP-A-2002-108898, the comment on the base image can be input in a manner related to a predetermined position of the comment on the particular base image. Nevertheless, by designating the position, a list of comments related to the particular position are read and displayed, and the desired comment is displayed by being selected from the list. In order to view a comment at the predetermined position of the base image, therefore, the operation of designating the particular position and selecting the desired comment from the comment list is required. Also, while the comment is displayed, the base image is not displayed, and therefore, it is difficult to positively confirm the relation between the comment on display and the base image.

Further, it is unknown to the user whether the comment exists at an intended position or not, as long as the particular position is not designated. In the absence of a comment, no comment is displayed by the designating operation wastefully.

SUMMARY OF THE INVENTION

This invention has been achieved in view of the problem described above, and the object of the invention is to provide a method of displaying a document with an image in which the information such as a comment added to the base image can be viewed immediately in relation to the base image.

In order to achieve the object described above, according to a first aspect of this invention, there is provided a method of displaying a document with an image as a base image and the information added thereto on a document screen, wherein the information related to the added information including the position where the information is added on the document screen with the base image displayed thereon, the content and type of the added information, the time when the information is added and the attribute information of the author of the added information are stored and held in a data base, and wherein the added information corresponding to the related information is displayed together with the base image at the add position based on the related information on the document screen.

According to a second aspect of this invention, there is provided a method of displaying a document with an image, wherein one type of the added information is the text information, which is input as a search key word to search the data base for the text information having the added information coinciding with the search key word, and the added information obtained by search is displayed together with the base image on the add position based on the related information on the document screen.

According to a third aspect of this invention, there is provided a method of displaying a document with an image, wherein the added information includes a symbol, a pattern, a line and an image as objects, wherein the desired object is selected by an object selector arranged on the document screen, and wherein by designating a predetermined position of the document screen with the base image displayed thereon, the selected object is displayed at the designated position.

According to a fourth aspect of this invention, there is provided a method of displaying a document with an image, wherein the added information includes text information as an object, wherein the object selector selects a text information selector while at the same time designating a predetermined area of the document screen with the base image displayed therein, and wherein the text information is input and displayed in the designated area of the document screen with the base image displayed thereon.

According to a fifth aspect of this invention, there is provided a method of displaying a document with an image, wherein the document screen can be printed or edited with the information added thereto.

According to a sixth aspect of this invention, there is provided a method of displaying a document with an image, wherein a screen indicating a list of the information added to the document image is displayed together with the document image including the base image.

According to a seventh aspect of this invention, there is provided a method of displaying a document with an image, wherein the screen indicating the list of the added information is displayed in the order of addition of the information to the document screen.

According to this invention, the base image can be displayed together with the added information such as a comment, a pattern, a symbol, an image or a line on a screen on which the base image is displayed, and the base image and the added information can be viewed at the same time. While viewing the base image, therefore, the information generated by an author and added to the base image can be checked on the one hand and a particular part of the base image to which the information is added can be confirmed at a glance on the other hand.

BRIEF DESCRIPTION OF THE DRAWINGS

FIG. 3 is a diagram showing a specific example of each management table shown in FIG. 2.

FIG. 4 is a diagram showing a specific example of the content (attribute) of the information expressed by the XML format of each object (line, pattern, comment or symbol/image) managed as the "information on the plotted object in the tab" of the tab management table shown in FIG. 3.

DETAILED DESCRIPTION OF THE INVENTION

Embodiments of the invention are explained below with reference to the drawings.

Figure 1:
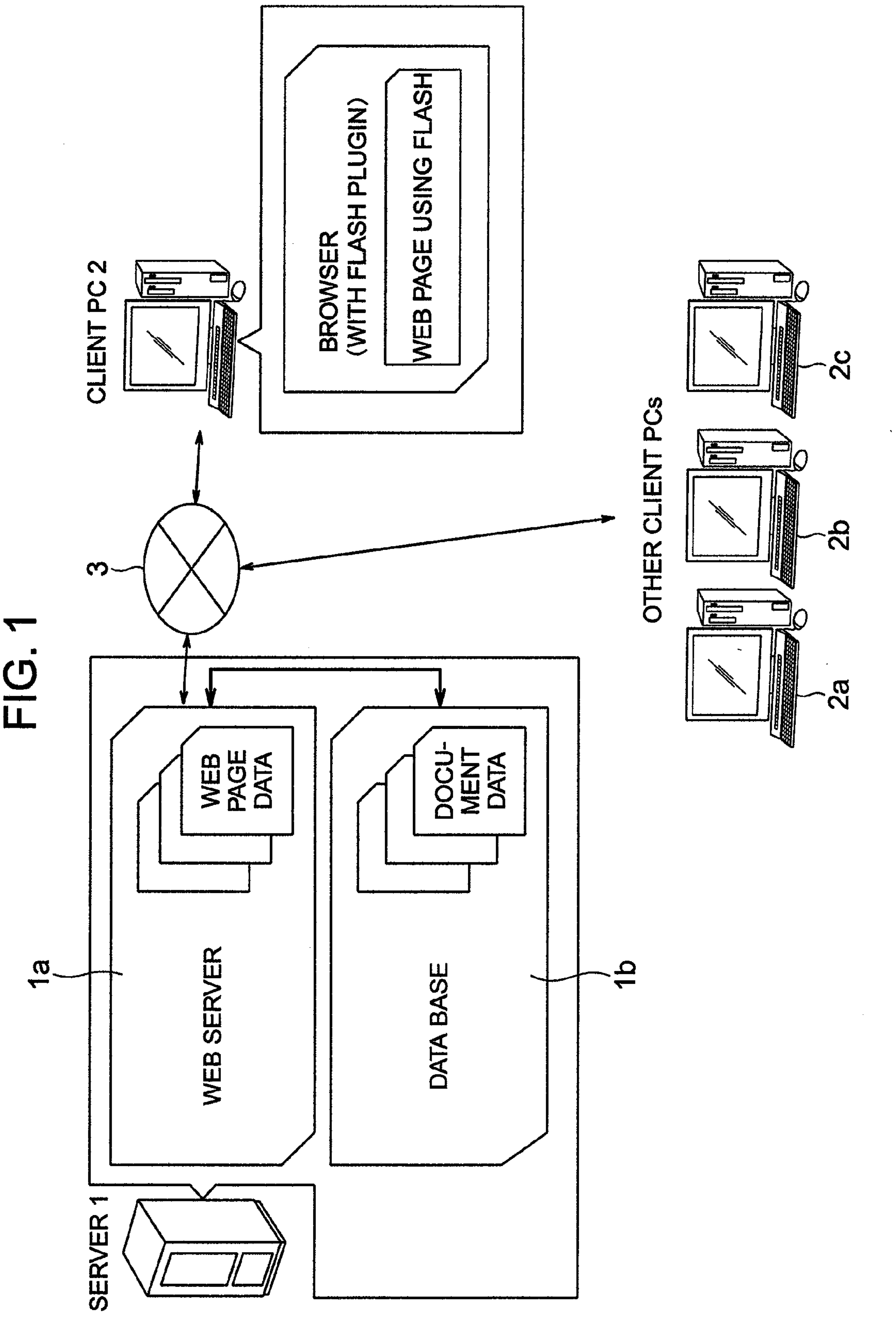
FIG. 1 is a diagram showing the configuration of a display system for executing the method of displaying a document with an image (hereinafter sometimes referred to as the document w/image) according to an embodiment of the invention.

FIG. 1 is a diagram showing the configuration of a display system for executing the method of displaying a document w/image according to an embodiment of the invention. In this diagram, reference numeral 1 designates a server, numeral 1*a* a Web server, numeral 1*b* a data base, numerals 2*a* to 2*c* client PCs (personal computers) and numeral 3 an internet.

In FIG. 1, the display system has a plurality of client PCs 2, 2*a* to 2*c* (although three client PCs are shown for convenience' sake, the number thereof is not limited to three) connected to the server 1 through the internet 3. The server 1 is configured of the Web server 1*a* and the data base 1*b*. The data base 1*b* has stored therein a document (w/image) having the base image generated using software for preparing contents by combining audio, still image, moving image, and animation graphics, for example, sold under the trademark FLASH in each of the client PCs 2, 2*a* to 2*c*. In the client PCs 2, 2*a* to 2*c*, the software such as FLASH or FLASH PLUGIN is installed, and the document w/image generated using this FLASH is uploaded to the Web server 1*a* and stored in the data base 1*b*. All the documents w/image generated by the client PCs 2, 2*a* to 2*c* are stored in the data base 1*b*, and in response to a request from any of the client PCs 2, 2*a* to 2*c*, the document w/image stored in the data base 1*b* is downloaded to the requesting one of the client PCs 2, 2*a* to 2*c* by the Web server 1*a*. Any one of the client PCs 2, 2*a* to 2*c*, therefore, can acquire and browse the document w/image generated by any one of the client PCs 2, 2*a* to 2*c* (i.e. the document w/image generated by any other one of the client PCs 2, 2*a* to 2*c*).

All of these client PCs 2, 2*a* to 2*c* have a similar configuration. In the description that follows, the client PC 2 is taken as an example and the same applies to all the other clients.

In response to a request from the client PC 2, the document corresponding to the request is acquired from the data base 1*b* by the Web server 1*a*, which generates and downloads the Web page data to the requester client PC 2 through the internet 3. The client PC 2 acquires and displays the document w/image from the Web server 1*a* using the FLASH PLUGIN installed in the Web browser.

Also, the client PC 2 can add an object such as a comment, a symbol indicating a person or a vehicle, a pattern such as a circle, a line such as an arrow or a reduced image to the acquired document w/image as added information. This added information, at the request of the client PC 2, is uploaded to the Web server 1*a* through the internet 3. In the Web server 1*a*, the added information thus acquired is stored in the data base 1*b* in the form related to the document w/image corresponding to the image document with the particular information added by the client PC 2 in the data base 1*b*.

Also, the client PC 2 can generate a new document w/image and upload it to the Web server 1*a*. The Web server stores this document w/image additionally in the data base 1*b*.

Figure 2:
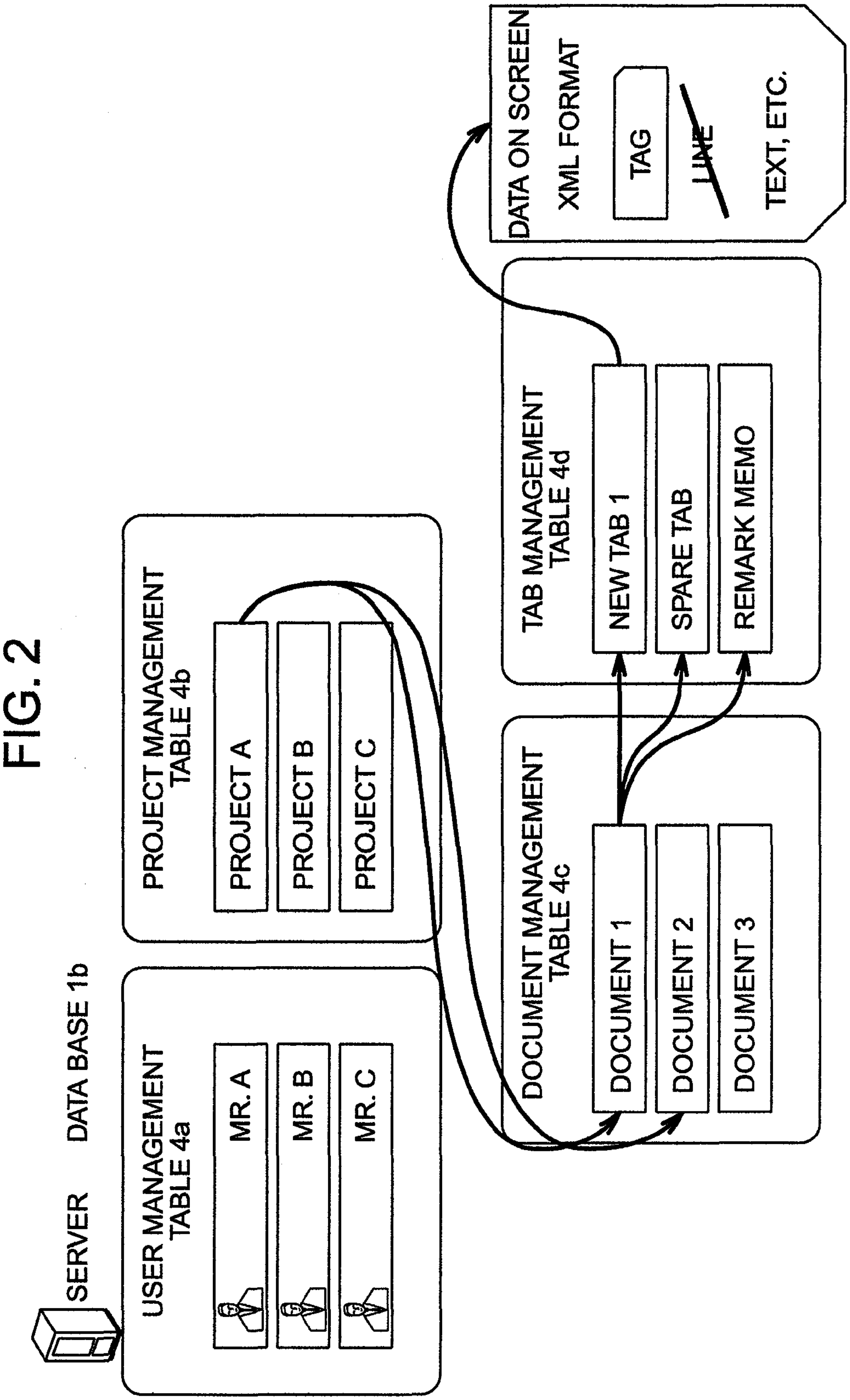
FIG. 2 is a diagram showing a specific example of management tables of the data base shown in FIG. 1.

FIG. 2 is a diagram showing a specific example of the management tables of the data base 1 shown in FIG. 1. Numeral 4*a* designates a user management table, numeral 4*b* a project management table, numeral 4*c* a document management table and numeral 4*d* a tab management table.

Upon generation of a new document w/image by the user, a "project" higher in hierarchical level is set in this document w/image. This project is set for a given job such as a meeting and contains at least one document w/image. In the case where a plurality of images are generated each by photographing a memo on the blackboard during a meeting or the result of the meeting, for example, a document w/image is generated for each of these images. The resulting plurality of the documents w/image belong to one project. Also, assume that a new image is generated later for the same meeting and a document w/image is generated for this image. This document w/image can be added to the same project as the aforementioned project. Incidentally, the user who generates a new project by generating a new document w/image is an author (generator) of this project. A new document w/image, however, can be added to an existing project also by the user other than the author of the particular project.

Also, assume that a document w/image has a plurality of tabs set for the image thereof and a new project is set by generating this document w/image. Before processing this document w/image, one tab is used (the remaining tabs are hereinafter referred to as the "spare tabs", while the tab used, unless otherwise specified, is referred to simply as "the tab"), and the base image just picked up is displayed on this tab. In the case where the user adds a comment to the image in this tab or otherwise processes the image and gives a command to store it in another tab, one of the spare tabs is used, resulting in an increased number of tabs for this document w/image.

The data base 1*b*, as shown in FIG. 2, has tables for managing the authors, the projects, the documents w/image and the tabs.

The data base 1*b* has set therein a user management table 4*a* for managing the authors who generate projects, a project management table 4*b* for managing the projects generated, a document management table 4*c* for managing the documents w/image and a tab management table 4*d* for managing the tabs set for each document and a remark memo input at the time of generating each document w/image. The tab management table 4*d* also manages a pattern such as a tag or a line, a text (character string) and a mark added to the image of the document w/image for each tab. Incidentally, this pattern and mark may be hereinafter sometimes referred to as "the symbol" collectively.

In the case shown in FIG. 2, the user management table 4*a* manages "Mr. A", "Mr. B" and "Mr. C" as authors. In the data base 1*b*, therefore, the projects, i.e. the documents w/image of these three authors are stored and managed. The "project A", "project B" and "project C" are managed in the project management table 4*b*. In this table, the project A is generated by the author "Mr. A", the project B by the author "Mr. B" and the project C by the author "Mr. C".

In the document management table 4*c*, the documents w/image 1, 2, 3 are managed, and in this case, the documents 1, 2 w/image are associated with the project A. In the tab management table 4*d*, as described above, the tab set for each document and the remark memo input at the time of generating the document w/image are managed, and in this case, the document w/image 1 is taken up as an example.

FIG. 3 is a diagram showing a specific example of each management table shown in FIG. 2.

In FIG. 3, the user management table 4*a* is for managing a management item "field name" $4a_1$, a management item "unique ID" $4a_2$ constituting an ID (identifier) allocated to the user, a management item "user name" $4a_3$ constituting the name allocated to the user, a management item "pass word" $4a_4$ allocated to the user and a management item "display name" $4a_5$ constituting the user name and displayed to indicate the user.

The project management table 4*b* is for managing a management item "field name" $4b_1$, a management item "unique ID" $4b_2$ constituting an ID (identifier) allocated to the project, a management item "project title" $4b_3$ indicating the title of the project, a management item "management code" $4b_4$ allocated to the project, a management item "remark" $4b_5$, a management item "unique ID of author" $4b_6$ indicated by the management item "unique ID" $4a_2$ of the user management table 4*a*, a management item "generation date/hour" $4b_7$ of the project, a management item "unique ID of last update user" $4b_8$ indicating the last user who has updated the document w/image in this project, a management item "last update date/hour" $4b_9$, and a management item "limited user list" $4b_{10}$ indicating the user capable of using of the project. The management item "management code" $4b_4$ is used for project search.

The document project management table 4*c* is for managing a management item "field name" $4c_1$, a management item "unique ID" $4c_2$ constituting an ID allocated to a document w/image, a management item "unique ID of project associated with document" $4c_3$ indicating the project associated with the document w/image, a management item "title" $4c_4$ indicating the title of the document w/image, a management item "information on base image" $4c_5$, a management item "unique ID of author" $4c_6$ indicated by the management item "unique ID" $4a_2$ of the user management table 4*a*, a management item "generation date/hour" $4c_7$ of the document w/image, a management item "unique ID of last update user" $4c_8$ indicating the last user who has updated the document w/image, a management item "last update date/hour" $4c_9$, a management item "unique ID of document locking user" $4c_{10}$ indicating the user locking the document w/image not to be updated, and a management item "document lock starting date/hour" $4c_{11}$. In the management item "base image information" $4c_5$, the base image is expressed in the XML language.

The tab management table 4*d* is for managing a management item "field name" $4d_i$, a management item "unique ID of document associated with tab" $4d_2$ indicating the document w/image associated with the tab, a management item "unique ID of project associated with tab" $4d_3$ indicating the project associated with the tab, a management item "in-document tab position" $4d_4$ indicating the tab position in the document w/image designated by the management item "unique ID of document associated with tab" $4d_2$, a management item "tab caption" $4d_5$, a management item "in-tab plotted object information" $4d_6$ constituting the information on the information to be added (i.e. an object) such as a line, a pattern, a comment or a symbol/image plotted in the tab, and a management item "character string to be retrieved for whole document search" $4d_7$ constituting a text added to the particular tab and to be retrieved. The management item "in-tab plotted object information" $4d_6$ manages the position, size, color, transparency and the like information on the object such as a comment on the one hand and the information on the relation (grouping), if any, between different objects such as a pattern and a comment on the other hand.

FIG. 4 is a diagram showing a specific example of the content of information (attribute) indicated by the XML format of each object (line, pattern, comment or symbol/image) managed by the management item "in-tab plotted object information" in the tab management table 4*d* shown in FIG. 3.

In FIG. 4, the attribute of each object managed by the management item "in-tab plotted object information" $4d_6$ in the tab management table 4*d* is expressed in the XML language.

Items managed as attributes of an object indicating a "line (straight line)", i.e. a line object, as shown in FIG. 4, include an "arrangement X coordinate" and an "arrangement Y coordinate" indicating the display position of the straight line (which are the position coordinates of a designation starting point of the straight line designated on a display screen), a "move prohibit flag" preventing the movement of the line displayed and set on the display screen, the "thickness" and the "color" of the line displayed, the "width" and "height" of an area of the line displayed (in the case where the line is inclined, each of the opposed corners of the area constitutes each end of the line, and the coordinate position of one of the ends is expressed as the "arrangement X coordinate" and the "arrangement Y coordinate" described above. The "height"=0 for a horizontal straight line, and the "width"=0 for a vertical straight line), the "display transparency" of the line and the "arrow class" indicating the type of the straight line according to the presence or absence of an arrow.

Items managed as the attributes of an object indicating a "pattern (rectangle, ellipse)", i.e. a pattern object, as shown in FIG. 4, include an "arrangement X coordinate" and an "arrangement Y coordinate" indicating the display position of the pattern (which are the position coordinates of the designation starting point of the pattern designated on a display screen), a "move prohibit flag" preventing the movement of the pattern displayed and set on the display screen, a "pattern type" indicating the type of the pattern such as a rectangle or an ellipse, the "width" and the "height" of the pattern displayed, the "thickness of outer peripheral line" and the "color of outer peripheral line" indicating the thickness and the color, respectively, of the line of the pattern, the "paint flag" to paint the interior of the pattern, and the "paint color" and the "paint transparency" indicating the color and transparency, respectively, of the paint.

Items managed as the attributes of an object indicating a "comment", i.e. a "comment object" include, as shown in FIG. 4, an "arrangement X coordinate" and an "arrangement Y coordinate" indicating the comment display position (which are the position coordinates of the designation starting point in the comment display area designated on the display screen), a "move prohibit flag" preventing the movement of the comment displayed and set on the display screen, a "font name", a "character size", a "character color", a "character thickening flag" instructing the character to be displayed in thick form, a "tag display flag" indicating whether the comment is displayed within a tag (frame) or not, a "tag outer peripheral line", a "tag paint color" and a "tag paint transparency" for the tag, a "last update user name" indicating the author of the comment, and a "URL". The character string of the particular comment is also managed.

Items managed as the attributes of an object indicating a "symbol" or an "image", i.e. "symbol/image object" include, as shown in FIG. 4, an "arrangement X coordinate" and an "arrangement Y coordinate" indicating the display position of the symbol or the image (which are the position coordinates of the designation starting point of the display area of the symbol or the image, as the case may be, designated on the display screen), a "move prohibit flag" to prevent the movement of the symbol or the image displayed and set on the display screen, an "image type", an "image holding path" (this image is held in the server 1 (FIG. 1)), a "display magnification" and a "display transmittance" of the symbol or the image. In the case under consideration, the image is held in a predetermined size and a predetermined transparency in the server 1, and the size and the transparency thereof can be changed by the client PC 2 (FIG. 1).

In each document w/image, assume that an object is added to the base image of the tab on display. This object is indicated by the XML format described above, and managed by the management item "in-tab plotted object information" $4d_6$ of the tab management table 4*d* corresponding to the tab of this document w/image. In the case where the object is a "comment", on the other hand, it is managed by the management item "character string to be retrieved for whole document" $4d_7$ of the tab management table 4*d*.

Next, the method of displaying a document w/image on the client PC 2, executed on the system of FIG. 1 according to an embodiment of the invention is explained with reference to FIGS. 5 to 15.

Figure 5:
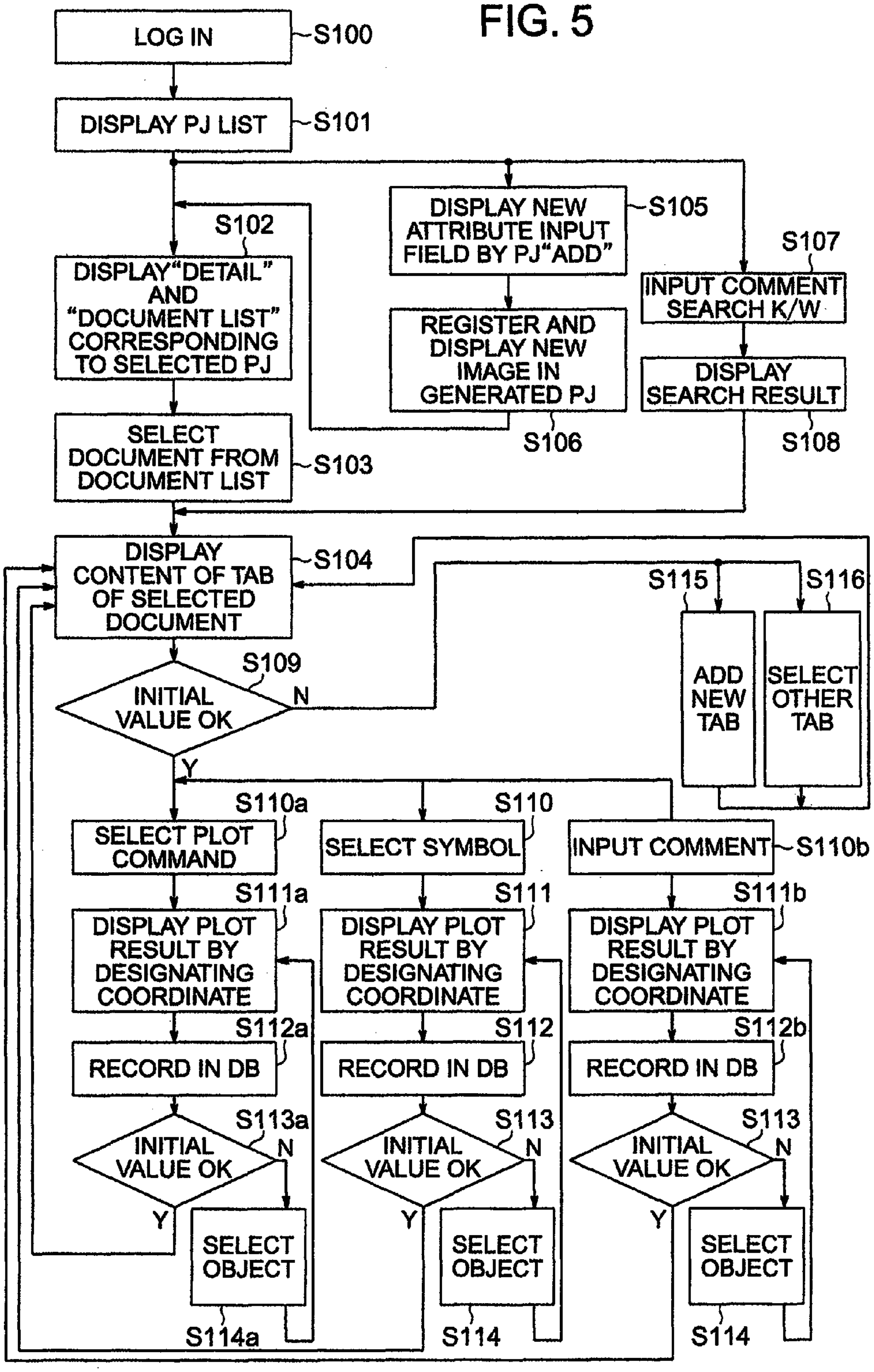
FIG. 5 is a flowchart showing a series of processing steps for the method of displaying a document w/image according to an embodiment of the invention.

FIG. 5 is a flowchart showing a series of the processing steps in the client PC 2 for executing the method of displaying the document w/image according to this embodiment.

First, in FIGS. 1 and 5, the server 1 is logged in by the client PC 2 (step S100 in FIG. 5). In the server 1, the Web server 1*a* reads the project management table 4*a* of all the projects in the data base 1*b*, and by generating the Web page data for these projects, downloads them to the client PC 2 that has given a request. The client PC 2 acquires this Web page data, and a project list screen indicating a list of projects is displayed on the display screen of the display unit of the client PC 2 (step S101 in FIG. 5). From this project list, the user selects the desired project. Then, the detailed information on the selected project and a project select screen indicating a list of documents associated with the project are displayed together with the project list (step S102 in FIG. 5).

Figure 6:
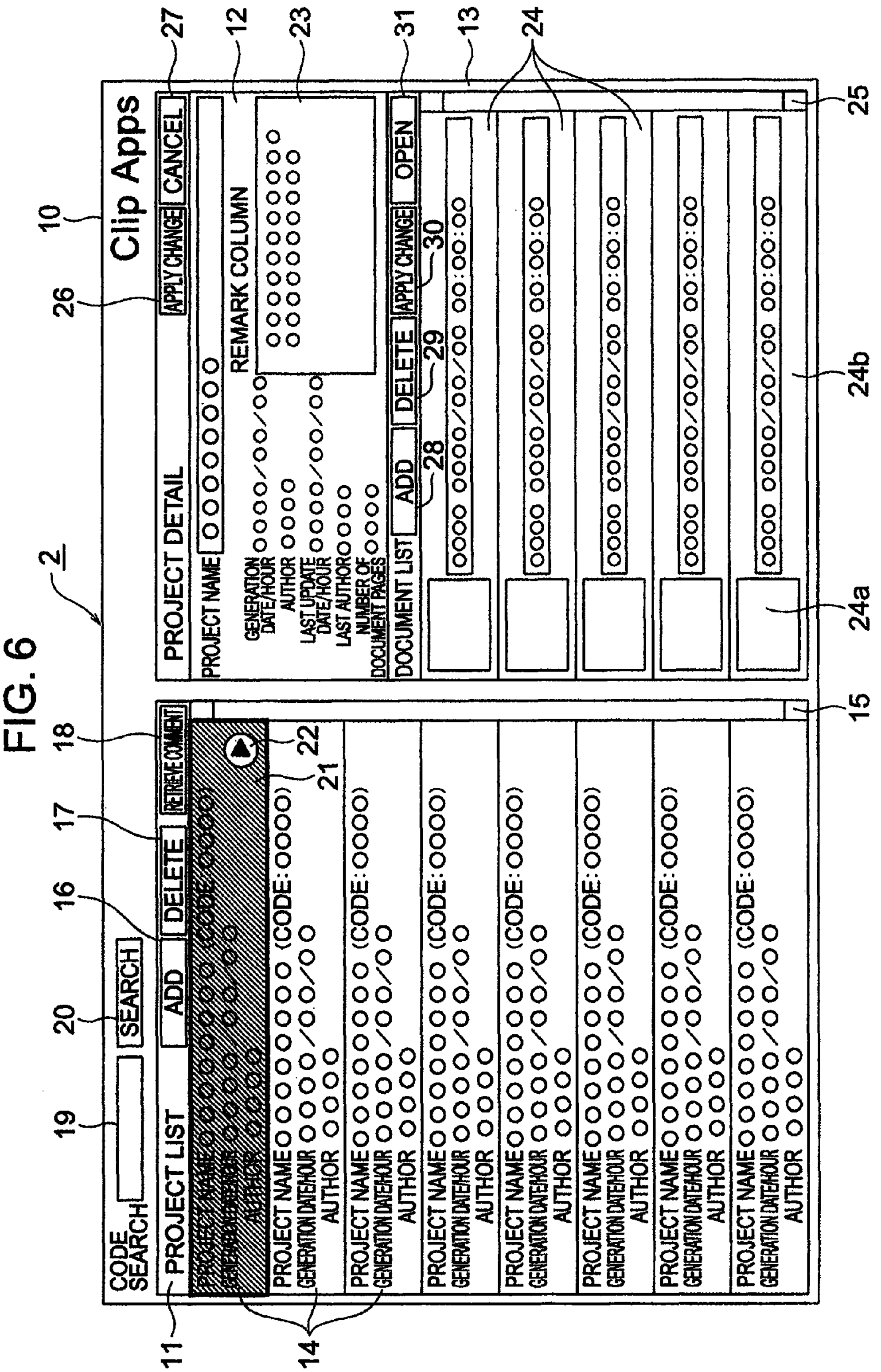
FIG. 6 is a diagram showing a specific example of a project select screen displayed in step S102 in FIG. 5.

FIG. 6 is a diagram showing a specific example of the project select screen. Numeral 10 designates a project select screen, numeral 11*a* project list screen, numeral 12 a project detail screen area, numeral 13 a document list screen, numeral 14 a project column, numeral 15 a scroll operation section, numeral 16 an "add" button, numeral 17 a "delete" button, numeral 18 a "comment search" button, numeral 19 a search code input section, numeral 20 a "search" button, numeral 21*a* cursor, numeral 22 an arrow, numeral 23 a remark column, numeral 24 a document column, numeral 24*a* a base image, numeral 24*b* an attribute data, numeral 25 a scroll operation section, numeral 26 a "apply change" button, numeral 27 a "cancel" button, numeral 28 an "add" button, numeral 29 a "delete" button, numeral 30 an "apply change" button and numeral 31 an "open" button.

In FIG. 6, the project list screen 11 with at least one project column 14 vertically arranged is displayed in the left half area of the project select screen 10. The project columns 14 covers all the document data read from the data base 1*b* by the server 1. Each project 14 data described in the project columns 14 includes the management item "user name" $4a_3$ of the author of the project in the user management table 4*a* shown in FIG. 3 and the management item "generation date/hour" $4b_7$ read by the author of the project from the project management table 4*b* shown in FIG. 3, based on the management item "project title" $4b_3$, the management item "management code" $4b_4$ and the management item "unique ID of generating author" $4b_6$. The number of the project columns 14 displayed at a time on the project list screen 11 is limited, and therefore, the scroll operation section 15 is arranged on the right side of the project list screen 11. By operating this scroll operation section 15, the arrangement of the project columns 14 on the project list screen 11 can be vertically scrolled, thereby making it possible to display the project column 14 which otherwise could not be displayed.

Also, an "add" button 16 for adding a project, a "delete" button 17 for deleting any of the project columns 14 of the project list screen 11, and a "comment search" button 18 for retrieving a document with a comment as a key word, are arranged on the upper side of the project list screen 11. On the project list screen 11, designate an unrequired project column 14 and operate the "delete" button 17. Then, the particular project column 14 is deleted from the project list screen 11. This operation is notified to the Web server 1*a* shown in FIG. 1, so that the document data corresponding to the particular project column 14 is deleted from the data base 1*b* by the Web server 1*a*. In the process, the management tables 4*b*, 4*c*, 4*d* corresponding to the particular project column 14 shown in FIG. 3 are deleted, and the user management table 4*a* for the user who has generated only this project is also deleted.

Incidentally, the "add" button 16 and the "comment search" button 18 are described later.

Further, a search code input section 19 and a "search" button 20 are arranged on the upper side of the project list screen 11 of the project select screen 10. Through these means, the user designates the desired project from the management item "management code" $4b_4$, and displays it on the project list screen 111. In the case where the user inputs the search code for the desired project, i.e. the management item "management code" $4b_4$ and operates the "search" button 20, then the Web server 1*a* correspondingly searches for the project of the management item "management code" $4b_4$ in the data base 1*b*, and downloads the result to the requester client PC 2 as the Web page data. As a result, only the project column 14 of the particular project is displayed on the project list screen 11 of the project select screen 10 of the client PC 2 (or the Web page data of all the projects are generated in the data base 1*b* and downloaded, and the list of the projects is displayed on the project list screen 11. In this case, the project column 14 of the project retrieved by the search code may be displayed at the head of this list).

Incidentally, on the display screen of the client PC 2 for displaying these screens, a predetermined one can be designated by cursor operation. As an alternative, a touch panel may be arranged on the display screen and by touching this display screen, a predetermined screen may be designated.

Step S101 shown in FIG. 5 represents a state in which the project list screen 11, the search code input section 19 and the "search" button 20 are displayed on the project select screen 10.

The project select screen 10 shown in FIG. 6 represents the state of step S102 in which the desired project column 14 (in the case under consideration, the desired project column 14 arranged at the head, as an example) is selected on the project list screen 11 of the project select screen 10 displayed in step S101.

On this project select screen 10, the selected project column 14 is focused by a framed cursor 21 or the like. At the same time, the project detail screen 12 and the document list screen 13 are displayed in vertical arrangement in the right half portion of the project select screen 10, i.e. on the right side of the project list screen 11.

Incidentally, the arrow 22 directed toward the project detail screen 12 and the document list screen 13 is displayed on the right side in the project column 14 in focus. This arrow indicates that the project detail screen 12 and the document list screen 13 are displayed on the right side, i.e. that the project detail screen 12 and the document list screen 13 are associated with the project of the project column 14 with the arrow 22 displayed therein.

On the project detail screen 12, the attribute data of the project management table 4*b* in the data base 1*b* (FIG. 1) corresponding to the project of the selected project column 14 is displayed as the detail data of the selected projected column 14. Specifically, the management item "project title" $4b_3$ of the project management table 4*b* is displayed as the "project name" on the project detail screen 12 as shown, and the management item "generation date/hour" $4b_7$ as the "generation date/hour" as shown. Also, the management item "user name" $4a_3$ in the user management table 4*a*, shown in FIG. 3, of the author of this project based on the management item "unique ID of the generating user" is displayed as the "author" as shown, the management item "last update date/hour" $4b_9$ is displayed as the "last update date/hour" as shown, and the management item "user name" $4a_3$ in the user management table 4*a* shown in FIG. 3 based on the management item "unique ID of last update user"s displayed as the "last author" as shown. Further, the number of the pages of the document associated with the designated project is determined by the Web server 1*a* based on the management item "unique ID of project associated with document" in the document management table 4*c* in the data base 1*b*, and this number of pages is displayed as the "number of document pages" as shown. Also, the remark column 23 is displayed on the project detail screen 12, and the content of the "remark" $4b_5$ managed by the project management table 4*b* is displayed in this remark column 23.

The project detail screen 12 has the "change application" button 26 for changing the description on the project detail screen 12 such as the content of the remark column 23 and the "cancel" button 27 for cancelling the description for a change. In this way, the description on the project detail screen 12 can be changed or the change in the description can be cancelled.

On the document list screen 13, the document columns 24 indicating the documents associated with the selected project columns 14 are displayed in vertical arrangement. The document columns 24 as many as the number of pages of the documents displayed on the project detail screen 12 can be displayed on the document list screen 13. Since the number of pages that can be displayed at the same time is limited, however, the scroll operation section 25 is arranged on the right side of the document list screen 13. By operating this scroll operation section 25, the document columns 24 are scrolled vertically, and a given document 24 that has thus far been not displayed can be displayed.

The base image 24*a* and the attribute data 24*b* thereof are displayed in each document column 24. The attribute data 24*b* includes the management item "title" $4c_4$ and the management item "base image information" $4c_5$ managed in the document management table 4*c* of the data base 1*b*.

Incidentally, on the upper side of the document list screen 13, there are arranged an "add" button 28 for adding a new document to the designated project, a "delete" button 28 for deleting the document associated with the project, a "change application" button 30 for changing the content of the document and an "open" button 31 for opening the document column 24 on display and displaying the content thereof.

In this way, on the project select screen 10, the list of the project columns 14 for respective projects is displayed, and the availability of a given type of project can be checked. Also, by selecting the desired one of the project columns 14, the particular project column 14 is displayed together with the list of the documents associated with the particular project. Thus, a document associated with a project can be confirmed accurately and positively. Since the base image 24*a* is displayed in each document column 24, the outline of the particular document can be also checked easily and positively.

Figure 7:
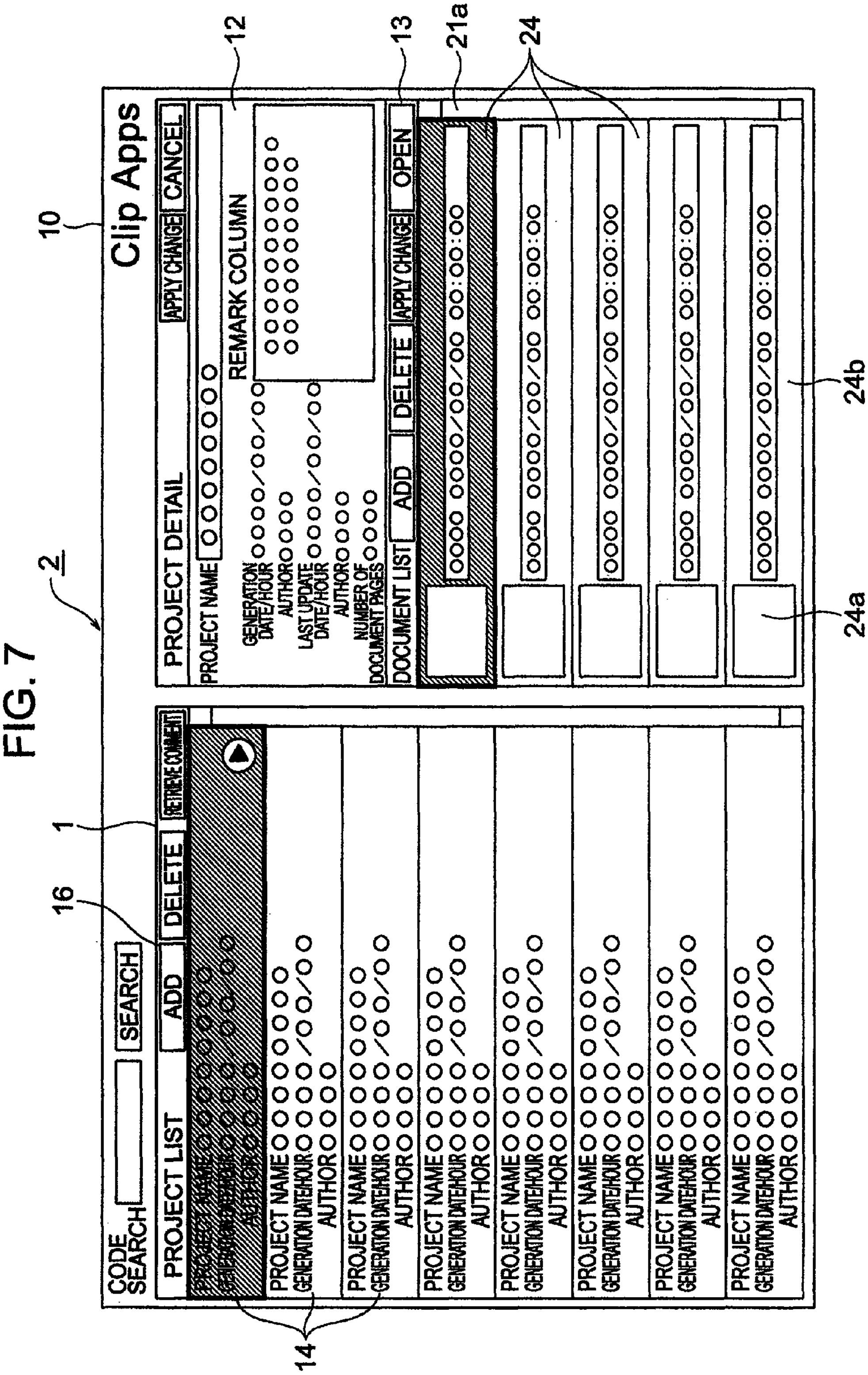
FIG. 7 is a diagram showing the state in which a document is selected on the project select screen in FIG. 6.

One of the document columns 24, if selected on the document list screen 13 of the project select screen 10, is focused on the project select screen 10 by a framed cursor 21*a* or the like as shown in FIG. 7 (in FIG. 7, however, the corresponding parts are designated by the same reference numeral, and the reference numerals are partially not shown). Upon selective operation of the "open" button 31 (step S103 in FIG. 5), the document display screen is displayed (step S104 in FIG. 5).

Figure 8:
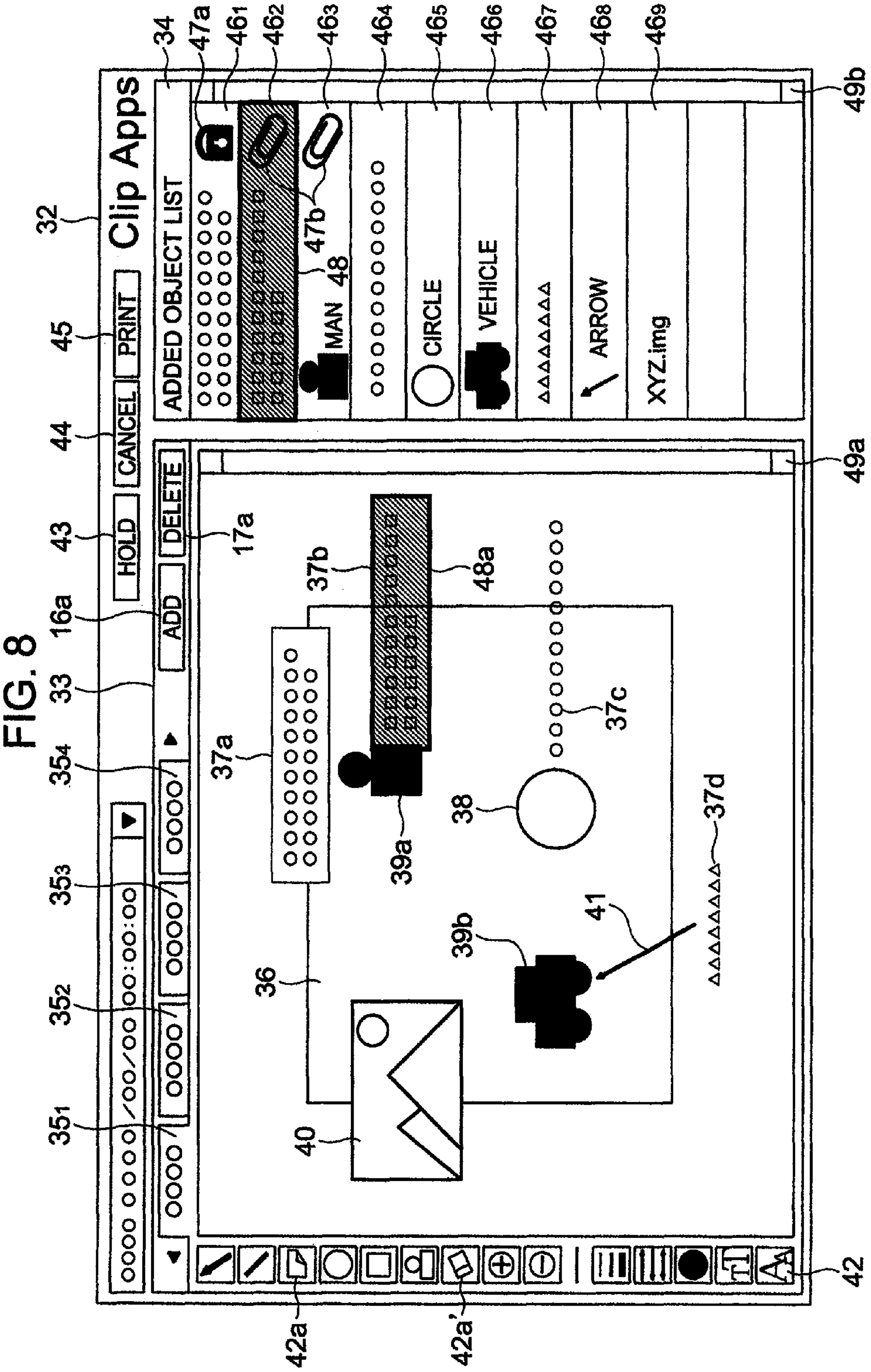
FIG. 8 is a diagram showing a specific example of a document display screen displayed by selecting the document in FIG. 6.

FIG. 8 is a diagram showing a specific example of the document display screen. Reference numeral 16*a* designates an "add" button, numeral 17*a* a "delete" button, numeral 32 a document display screen, numeral 33 a document screen, numeral 34 an added object list screen, numerals $35_1$ to $35_4$ tabs, numeral 36 a base image, numerals 37*a* to 37*d* comments, numeral 38 a pattern, numerals 39*a*, 39*b* symbols, numeral 40 an image, numeral 41*a* line, numeral 42 an object selector, numeral 42*a* a sentence icon, numeral 43 a "hold" button, numeral 44 a "cancel" button, numeral 45 a "print" button, numerals $46_1$ to $46_9$ object columns, numeral 47*a* a lock icon, numeral 47*b* a grouping icon, numerals 48*a*, 48*b* cursors, and numerals 49*a*, 49*b* scroll operation sections. Those parts corresponding to the parts shown in the drawings above are designated by the same reference numerals, respectively, and not explained again.

In FIG. 8, the document screen 33 and the added object list screen 34 are displayed in arrangement on left and right sides of the document display screen 32.

On the document screen 33, the tabs $35_1$, $35_2$, $35_3$, $35_4$ and so on (which may be collectively referred to as the tab 35) are set for each tab management table 4*d* managed by the data base 1*b* of the document selected on the project select screen 10, and one of the tabs is open. Assume, for example, that the tab $35_1$ is open.

On the tab 35, there are displayed objects such as the base image 36, the comments 37*a* to 37*d* (which hereinafter may be collectively referred to as the comment 37) added to the base image 36, the pattern 38, the symbols 39*a*, 39*b* (which may hereinafter be collectively referred to as the symbol 39), the image 40 and the line 41. These objects are added by the project author or other users to the document generated by the particular project author. As of the time when the document is generated, one tab 35 is available for the document, and only the base image 36 is displayed on the tab 35. In the data base 1*b* of the server 1, therefore, only one tab 35 is managed by the tab management table 4*d* associated with the document management table 4*c*.

The comment 37 on the tab $35_1$ is managed by the management item "character string to be retrieved for the whole document search" $4d_7$ in the tab management table 4*d* of the data base 1*b*, while the objects such as the pattern 38, the symbol 39, the image 40 and the line 41 are managed similarly by the management item "in-tab plotted object information" $4d_6$.

One each tab 35, though having the same base image 36, has a different content of display from another. In the tab 35, the object such as the comment, the line, the pattern, the symbol or the image can be added as described later. In the case where the new information with this object added thereto is held while keeping the tab 35 before addition of these objects, the new information can be set by operating the "hold" button 43 after adding the new information. This new tab is managed by a new tab management table 4*d* in the data base 1*b* of the server 1. In this way, the tab 35 can be added on the document display screen 32. Incidentally, the detailed screen operation is described later.

Also, the base image 36 and all the add objects displayed on the tab 35 displayed on the document screen 33 are erased and the tab 35 is changed to a spare tab by operating the "cancel" button 44. To remove a given tab, therefore, it is selected provisionally and the "delete" button 17*a* is operated. Once a given tab 35 is removed, the next tab 35 to be arrange or, in the absence of such a tab, the first tab 35 arranged is opened.

Also, by operating the "print" button 45, the content of the open tab 35 can be printed.

Incidentally, assume that an object such as a comment, a line, a pattern, a symbol or an image is to be added. The desired object can be set and displayed at a predetermined position with respect to the base image 36 by the drag-and-drop operation, for example, of the object selector 42 displaying a list of icons of the objects on the left side of the tab 35. In the case where a comment is to be added, a specified icon, or the sentence icon 42*a* in the case under consideration, is designated on the object selector 42, and the upper left and lower right points of the comment display area are designated. Then, the display area is displayed in rectangular form, and by inputting a comment through a keyboard or the like, the comment input in the display area is displayed.

On the added object list screen 34, there are displayed, in vertical arrangement in the reverse order of addition, such objects as the comment 37, the pattern 38, the symbol 39, the image 40 and the line 41 added to the tab 35 on display in open state. As a result, the objects added to the tab 35 can be viewed collectively as a list on the one hand and the history of object addition can be known at the same time.

As shown in FIG. 8, the tab $35_1$ has added thereto the objects such as the comments 37*a* to 37*d*, the pattern 38, the symbols 39*a*, 39*b*, the image 40 and the line 41. Also, on the added object list screen 34, there are displayed, in the order of addition on top, the object column $46_1$ for the comment 37*a*, the object column $46_2$ for the comment 37*b*, the object column $46_3$ for the symbol 39*a*, the object column $46_4$ for the comment 37*c*, the object column $46_5$ for the pattern 38, the object column $46_6$ for the symbol 39*b*, the object column $46_7$ for the comment 37*d*, the object column $46_8$ for the line 41 and the object column $46_9$ for the image 40. The added object list screen 34 shows that the comment 37*a* is the first object added to the tab $35_1$. Incidentally, these object columns $46_1$ to $46_9$ may sometimes be referred to collectively as the object column 46. In the case where a new object is added to the tab 35, the corresponding object column 46 is added to the head of the added object list screen 34.

Also, with regard to the object that cannot be deleted, the lock icon 47*a* is displayed in the corresponding object column 46. As an example, the lock icon 47*a* is added to the object column $46_k$, as shown, with the result that the comment 37*a* in the tab $35_1$ cannot be deleted.

In the case where two of the objects added to the tab 35 constitute one group, the grouping icon 47*b* is displayed in the object column 46 for each of these objects. The objects on the tab 35 in the object columns 46 to which the grouping icon 47*b* is added are arranged in one group in proximity to each other. In the case under consideration, the grouping icon 47*b* is added to the object columns $46_2$, $46_3$ with the result that the symbol 39*a* and the comment 37*b* are grouped. The object column 46 (the object column $46_1$ in this case) with the lock icon 47*a* not added thereto is designated on the added object list screen 34 of the open tab 35, and the delete icon (the eraser icon 42*a*', i.e. the seventh icon from the top in the case of FIG. 8) in the object selector 42 is operated. Then, the object corresponding to the object column 46 of the tab 35 is deleted, while at the same time deleting the object column 46 corresponding to this object. In the case where the two objects are grouped, however, one of them (for example, the comment 37*b*) is designated and the delete icon 42*a*' in the object selector 42 is operated. Then, the comment 37*b* and the corresponding object column $46_2$ are deleted. At the same time, the symbol 39*a* in the same group as the comment 37*b* is also deleted together with the corresponding object column $46_3$.

Incidentally, in the case where the desired object in the tab 35 is selected, this object is focused by the framed cursor 48*a*. At the same time, the corresponding object column 46 is similarly focused by the framed cursor 48*b*. In the case where the desired object column 46 is selected on the added object list screen 34, on the other hand, the object column 46 is focused by the framed cursor 48*b*, and at the same time, the object in the corresponding tab 35 is also focused by the framed cursor 48*a*. In the shown case, one of the comment 37*b* and the object column $46_2$ is selected and focused.

Also, with the desired icon selected on the object selector 42, assume that the mouse is clicked or the screen is touched at the desired position in the selected tab. A new object can thus be added to the open tab 35. At the same time, the object column 46 for this object is added at the head position on the added object list screen 34.

As described above, by operating each icon of the object selector 42, the unrequired object can be deleted or the required object can be added at the corresponding position, thereby making it possible to edit the tab 35.

Also, upon operation of the "add" button 16*a*, a tab holding method select screen 73 shown in FIG. 15 and described later is displayed, and a tab can be added.

Incidentally, each tab 35 has a scroll operation section 49*a* to scroll the display content vertically. Similarly, the scroll operation section 49*b* is arranged n the added object list screen 34 to scroll the list of the object columns 46 vertically.

The process of step S104 in FIG. 5 is explained above. Next, the project addition and the comment search are explained.

<<Project Addition>>

In step S101 explained in FIG. 5 above, the project detail screen 12 is not displayed on the project select screen 10 shown in FIG. 6. In the description that follows, this project select screen lacking the project detail screen 12 is referred to as the project select screen 10'.

While the project select screen 10' is on display, assume that the "add" button 16 displayed on the project list screen 11 of the project select screen 10' is operated. Then, the project add operation screen shown in FIG. 9 is displayed on the project select screen 10' (step S105 in FIG. 5).

Figure 9:
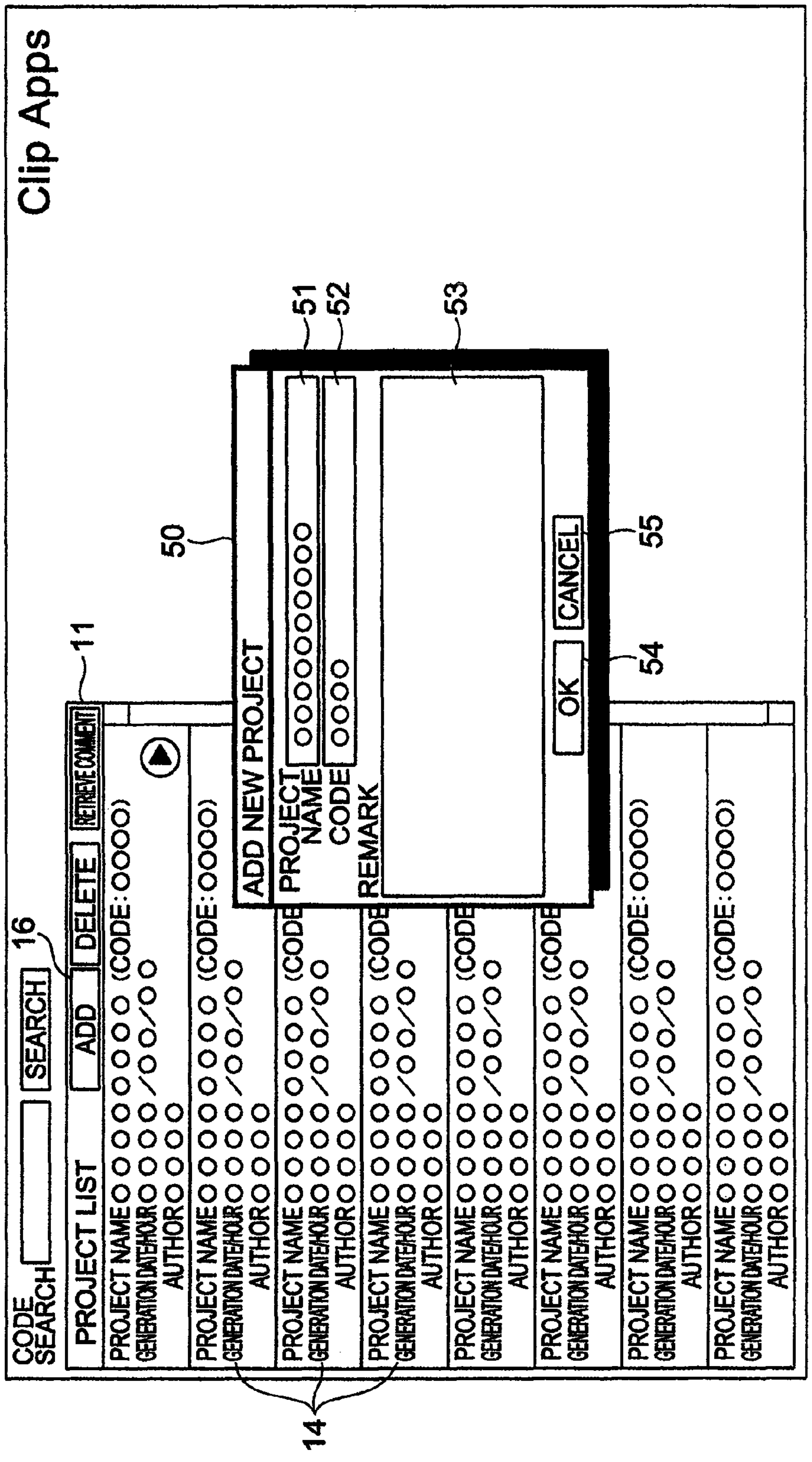
FIG. 9 is a diagram showing a specific example of a project select screen displayed by the project add operation through the processing steps shown in FIG. 5.

Incidentally, in FIG. 9, numeral 50 designates a project add operation screen, numeral 51*a* "project name" input section, numeral 52 a "code" input section, numeral 53 a "remark" input section, numeral 54 an "OK" button, and numeral 55 a "cancel" button. The parts identical with the corresponding parts in FIG. 6 are designated by the same reference numerals, respectively, and not explained again. Incidentally, the reference numeral of each part on the project list screen 11 is not required to be explained and not shown in the case under consideration.

In FIG. 9, the project add operation screen 50 is displayed in partially overlapped relation with the project list screen 11 on the project select screen 10'. The project add operation screen 50 has a "project name" input section 51, a "code" input section 52, a "remark" input section 53, an "OK" button 54 and a "cancel" button 55. The name of the project to be added (the name of a meeting, for example) is input to the "project name" input section 51, and the code to be added to this project is input to the "code" input section 52. Then, the complementary information of the project (such as the name of the project author, the document title, the name of the document author, etc.) is input to the remark column 53, and the "OK" button 54 is operated. In place of the project add select screen 50, the document add operation screen is displayed (step S106 in FIG. 5).

Also, in the case where the "OK" button 54 is operated after inputting each information on the project add operation screen 50, the input information is stored and held in the memory of the client PC 2.

The code input to the "code" input section 52 on the project add operation screen 50 shown in FIG. 9 is required to have never been used in the project column 14 displayed in the project list screen 11, and the author of the added project, by checking the project list screen 11, inputs the code not used in the project column 14 of the project list screen 11. The code, once input to the "code" input section 52, is transmitted to the Web server 1*a*. The Web server 1*a* determines whether this code is used or not for another project as the management item "management code" $4b_4$, and in the case where it is used for another project, the client PC is notified. As a result, on the project add operation screen 50, the code input to the "code" input section 52 is required to be erased, and another code to be input.

Incidentally, upon operation of the "cancel" button 55 on the project add operation screen 50, the project add operation screen 50 is erased, and only the original project select screen 10' is displayed as in the original state.

As described above, upon operation of the "OK" button 54 on the project add operation screen 50 shown in FIG. 9, the document add operation screen is displayed in place of the project add operation screen 50 (step S106 in FIG. 5).

Figure 10:
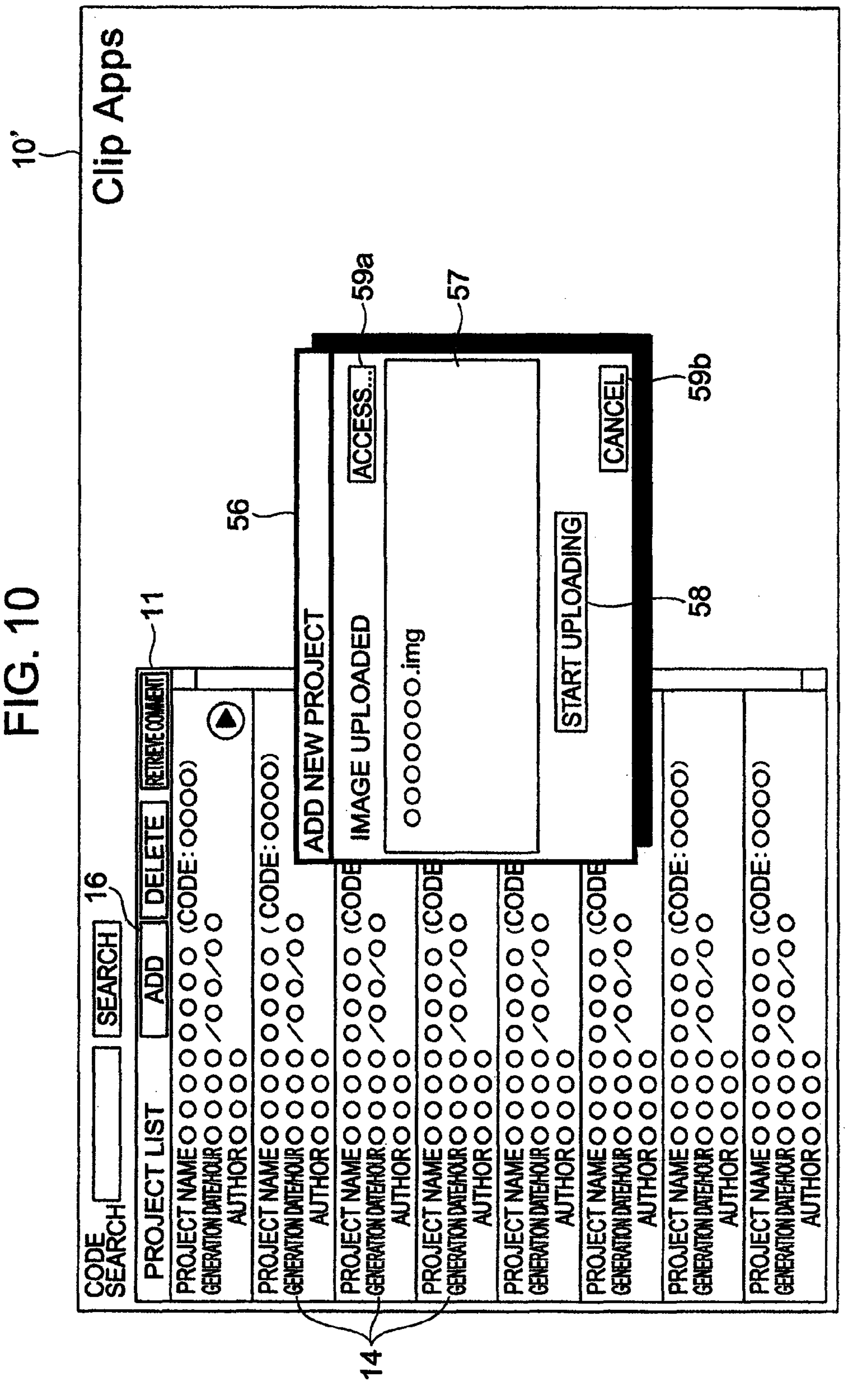
FIG. 10 is a diagram showing a specific example of a document add operation screen displayed following the project select screen shown in FIG. 9.

FIG. 10 is a diagram showing a specific example of the document add operation screen. Numeral 56 designates the document add operation screen, numeral 57 a base image input section, numeral 58 an "upload start" button, numeral 59*a* a "reference" button, and numeral 59*b* a "cancel" button. In FIG. 10, the parts identical with the corresponding ones of FIG. 6 are designated by the same reference numerals, respectively, and not explained again. Incidentally, the project list screen 11 is not required to be explained, and therefore, the reference numerals designating the parts thereof are not shown.

In FIG. 10, the document add operation screen 56, displayed in partially overlapped relation with the project list screen 11, includes a base image input section 57, an "upload start" button 58 and a "cancel" button 59*b*.

In the base image input section 57, the "reference" button 59*a* is operated and the base image held in the client PC 2 is selectively designated. In this way, the desired base image can be input. Also, by operating the "upload start" button 58, the base image thus input is uploaded to the Web server 1*a* (FIG. 1) together with the information on the objects input already on the project add operation screen 50 and held in the memory.

In the Web server 1*a*, the project management table 4*b* (FIG. 3) is generated for the project thus added on the one hand, and the document management table 4*c* and the tab management table 4*d* are generated for the document having the base image. The data base 1*b* is checked to see whether the author of this new project is managed or by the user management table 4*a* (FIG. 3), and if so managed, the process is finished. Otherwise, the user management table 4*a* for the particular author is generated.

The project management table 4*b* of the new project thus generated has registered therein the management item "unique ID" $4b_2$ and the management item "generation date/hour" $4b_7$, while at the same time generating by registering the project name input by the "project name" input section 51 as the management item "project title" $4b_3$, the code input to the "code" input section 52 as the management item "management code" $4b_4$ and the author ID as the management item "unique ID of generating author" $4b_6$.

Also, in the document management table 4*c* for the new document, the management item "unique ID" $4c_2$, the management item "unique ID of project associated with document" $4c_3$ and the management item "generation date/hour" $4c_7$ are registered on the one hand, and based on the information input at the "remark" input section 53 of the project add operation screen 50, the document title is registered as the management item "title" $4c_4$ and the base image information as the management item "base image information" $4c_5$ on the other hand. Also, the management item "unique ID of generating user" $4c_6$ is registered and generated for the document author. In this case, no object is added, and therefore, the management items $4c_8$ to $4c_{11}$ are not registered in the document management table 4*c* (FIG. 3).

Further, with regard to this new document, the tab management table 4*d* (FIG. 3) for a given tab 35 having only the base image is generated. Although the management items $4d_2$ to $4d_5$ are registered in the tab management table 4*d*, the management items $4d_6$, $4d_7$ are not registered on the tab 35 having only the base image.

Incidentally, the base image is related to the management item "base image information" in the document management table 4*c*.

Upon operation of the "download start" button 58 on the document add operation screen 56 shown in FIG. 10 (step S106 in FIG. 5), as described above, the Web server 1*a* generates the management tables 4*b* to 4*d*, which are stored in the data base 1*b* together with the base image 36. At the same time, the Web server 1*a* generates the Web page data from this information of the management tables 4*b* to 4*d* and downloads it to the client PC 2. As a result, the client PC 2 displays the project select screen 10 shown in FIG. 6 on the display screen thereof (step S102 in FIG. 5). On the project select screen 10, the project column 14 of the project newly added on the project list screen 11 is selected first and displayed in focused state. Therefore, the project detail screen 12 and the document list screen 13 for the project column 14 are also displayed. The document list screen 13, however, is configured of only the document column 24 of one tab having only the base image 24*a*.

Also, on this project select screen 10, the document column 24 is selected, and by operating the "open" button 31 shown in FIG. 6 (FIG. 7 and step S103 in FIG. 5), the document display screen 32 shown in FIG. 8 is displayed. On this document display screen 32, however, only the base image 36 is displayed (step S104 in FIG. 5).

The operation to add the project, though described above as the operation of the "add" button 16 on the project select screen 10' displayed in step S101 shown in FIG. 5, can be performed similarly on another screen having the "add" button 16 such as the project select screen 10 shown in FIG. 6 with equal effect.

<<Comment Search>>

Figure 11:
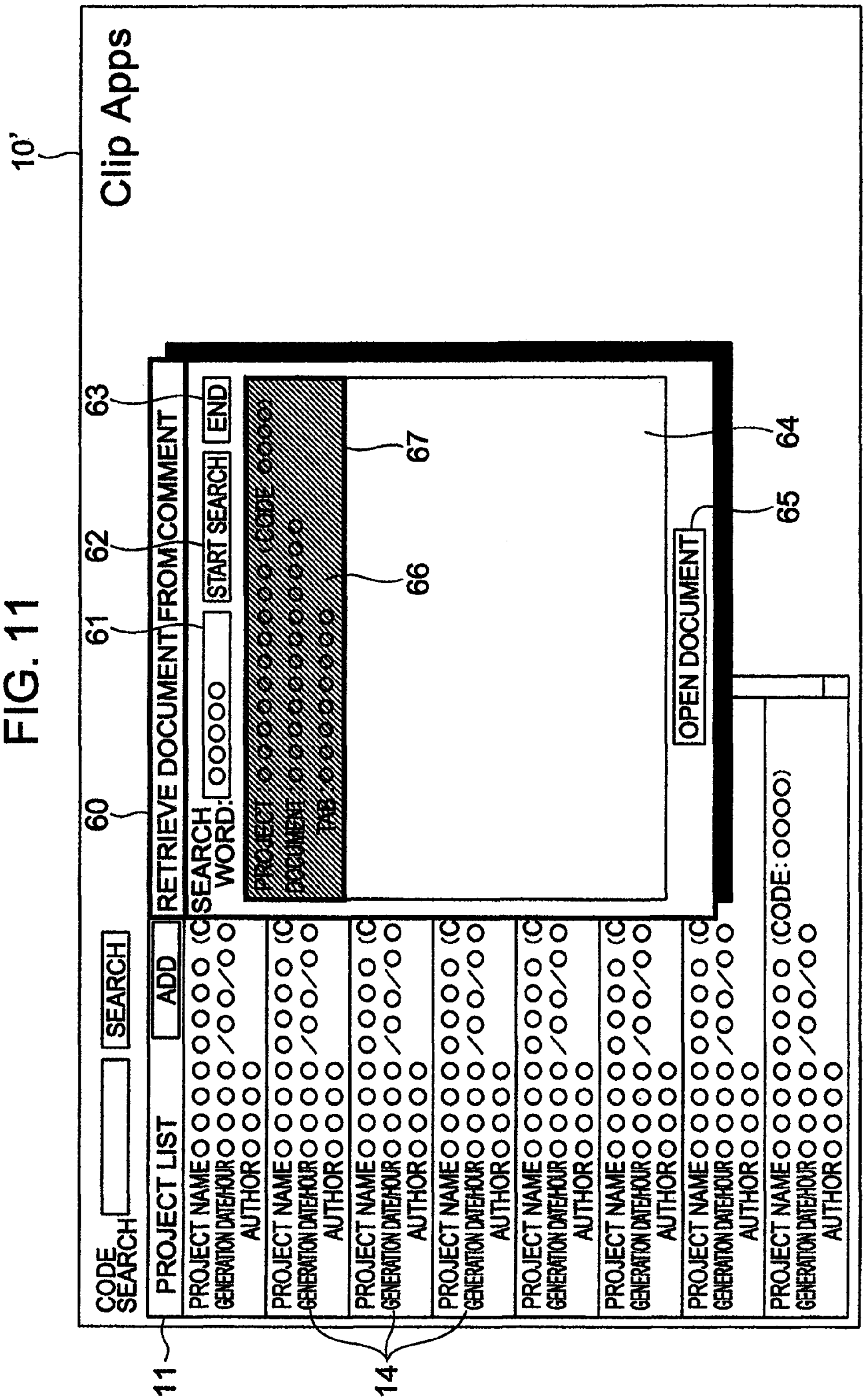
FIG. 11 is a diagram showing a specific example of a comment search operation screen displayed by the comment search operation on the project select screen shown in FIG. 6.

While the project select screen 10' is on display in step S101 of FIG. 5 as described above, assume that the "comment search" button 17 on the project list screen 11 of the project select screen 10' is operated. On the project select screen 10', the document search operation screen shown in FIG. 11 is displayed (step S107 in FIG. 5), and the desired comment is input in it. Then, the document containing this comment is retrieved and displayed (step S108 in FIG. 5).

Incidentally, in FIG. 11, numeral 60 designates a comment search operation screen, numeral 61*a* comment input section, numeral 62 a "search start" button, numeral 63 an "end" button, numeral 64 a search document display area, numeral 65 an "open document" button, numeral 66 a project column, and numeral 67 a cursor. In FIG. 11, the parts identical with the corresponding parts in FIG. 6 are designated by the same reference numerals, respectively, and not explained any further. Incidentally, the project list screen 11 is not required to be explained in the case under consideration, and therefore, the reference numerals of the parts thereof are not shown. Also, FIG. 11 shows the state in which the document is retrieved.

In step S107 shown in FIG. 11, the document search operation screen 60 is displayed in partially overlapped relation with the project list screen 11 on the project select screen 10'. On the document search operation screen 60, if on display, the comment input section 61, the "search start" button 62, the "end" button 63, the search document display area 64 and the "open document" button 65 are displayed. Since the document search has yet to be started, however, nothing is displayed in the search document display area 64.

In the case where the desired comment is input to the comment input section 61 and the "search start" button 62 is operated, the input comment is sent to the Web server 1*a* (FIG. 1). In the Web server 1*a*, the data base 1*b* (FIG. 1) is searched to retrieve the "character string to be retrieved for whole document search" $4d_7$ of the tab management table 4*d*. Then, the project having the document with the tab having this comment is determined from the document management table 4*c* and the project management table 4*b*, and the client PC 2 is notified. As a result, the project column 66 of the retrieved project is displayed in the search document display area 64 of the document add operation screen 60.

Assuming that one project is retrieved, the project column 66 for the one project is displayed in the search document display area 64. In the case where a plurality of projects are retrieved, on the other hand, a plurality of the project columns 66 for the respective projects are displayed.

In the project column 66, there are displayed the project name managed by the "project title" $4b_3$ of the project management table 4*b* in the data base 1*b*, the code managed by the "management code" $4b_4$, the document name managed by the "title" $4c_4$ of the document management table 4*c*, and the index managed by the "tab caption" $4d_5$ of the tab management table 4*d*. This example represents a case involving one tab containing the search comment, and therefore, only one tab and one document containing it are displayed. In the case where the search comment is contained in a plurality of tabs associated with different documents, on the other hand, each document name is displayed together with the index of the tab associated with each document name.

As described above, the project columns 66 are displayed as the result of searching the search document display area 64 of the document search operation screen 60. Upon designation of any of the project columns 66, the particular project column 66 is focused by the framed cursor 67 or the like. Then, by operating the "open document" button 65, the document display screen 32 shown in FIG. 8 is displayed in such a manner that the tab 35 containing the comment input in the comment input section 61 of the document search operation screen 60 is opened on the document screen 33, and the added object list screen 34 for the tab 35 is displayed (step S104 in FIG. 5).

Incidentally, upon operation of the "end" button 63 on the document search operation screen 60, the document search operation screen 60 is erased and the original project select screen 10' or the project select screen 10 is restored to the display state.

As described above, the document becomes retrievable based on the comment, and as the result of this retrieval, the tab including the particular comment can be viewed directly, thereby making it possible to reduce both the labor and time of the search operation greatly.

On the document display screen 32 shown in FIG. 8, an object can be added anew to the open tab 35 by selecting the desired object icon (by the drag-and-drop operation, for example) in the object selector 42 as described above. An example of this operation is explained below with reference to a symbol as an added object.

Figure 12:
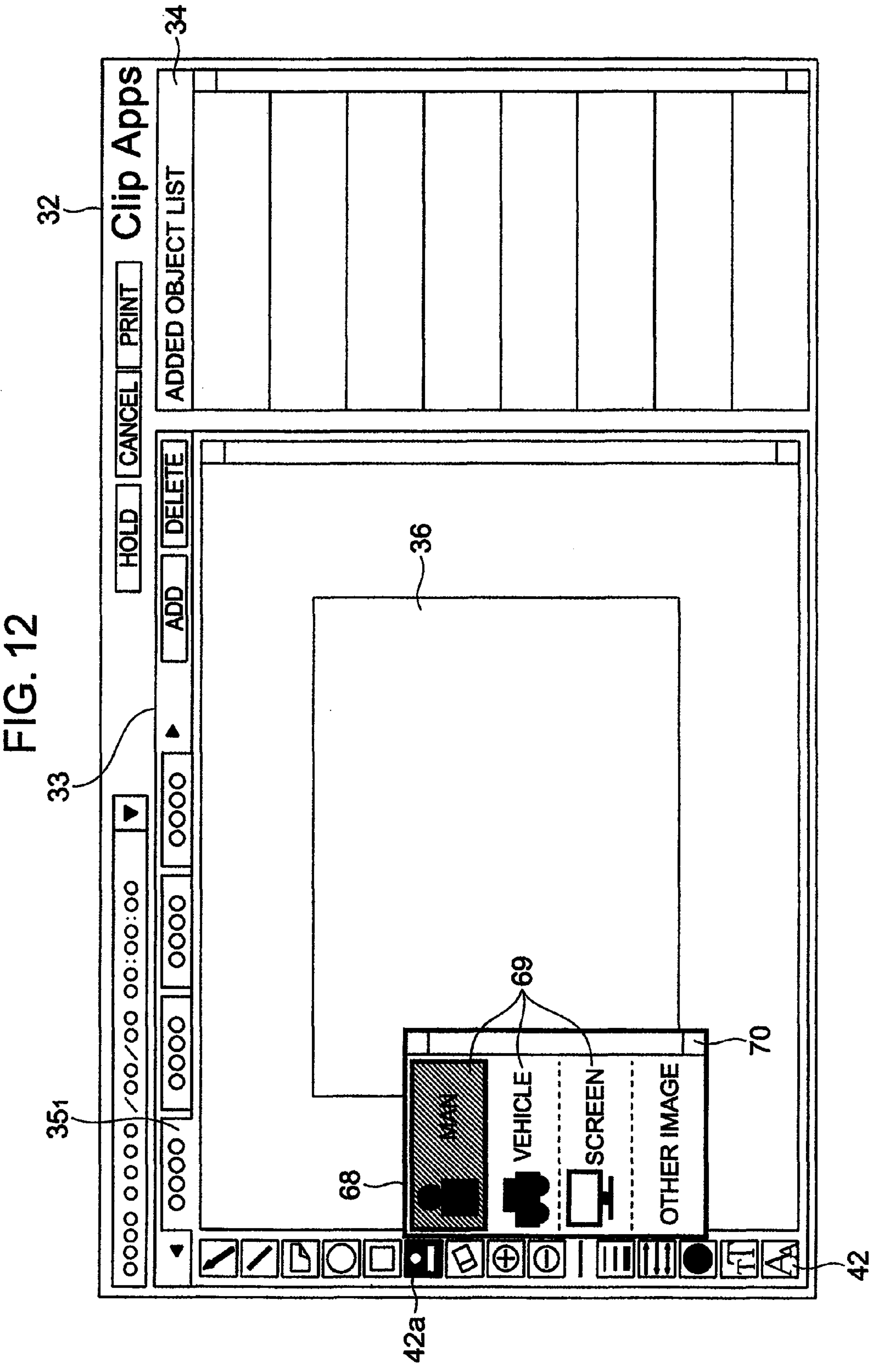
FIG. 12 is a diagram showing a specific example of a symbol icon list screen for adding a symbol on the document display screen.

Once the symbol icon 42*b* is selected in the object selector 42 of the document display screen 32 ("Y" in step S109 shown in FIG. 5), as shown in FIG. 12, a symbol icon list screen 68 is developed from the symbol icon 42*b*.

Incidentally, in FIG. 12, numeral 68 designates a symbol icon list screen, numeral 69 a symbol icon, and numeral 70 a scroll operation section. In FIG. 12, the parts identical with the corresponding ones in the drawings described above are designated by the same reference numerals, respectively, and not explained again.

In FIG. 12, the tab $35_1$ is shown to have only the base image 36. This is by reason of the fact that an object, if added to the tab $35_1$ as shown on the document display screen 32 in FIG. 8, can be deleted by setting the "delete" icon 42*a'* of the object selector 42 in select mode and clicking the left part of the mouse on the object to be deleted. Thus, the tab can be restored to the original state in which only the base image 36 is displayed (on the assumption that no object column 46 with the lock icon 47*a* set therein exists on the added object list screen 34, and the object column 46, if existent, would remain without being deleted).

On the symbol icon list screen 68, a plurality of symbol icons 69 are displayed as a list, and just in case all the symbol icons cannot be displayed on the symbol icon list screen 68, the list of the symbol icons 69 can be scrolled vertically by the scroll operation section 70 in the symbol icon list screen 68, thereby making it possible to display the symbol icons 69 which otherwise could not be displayed.

Figure 13:
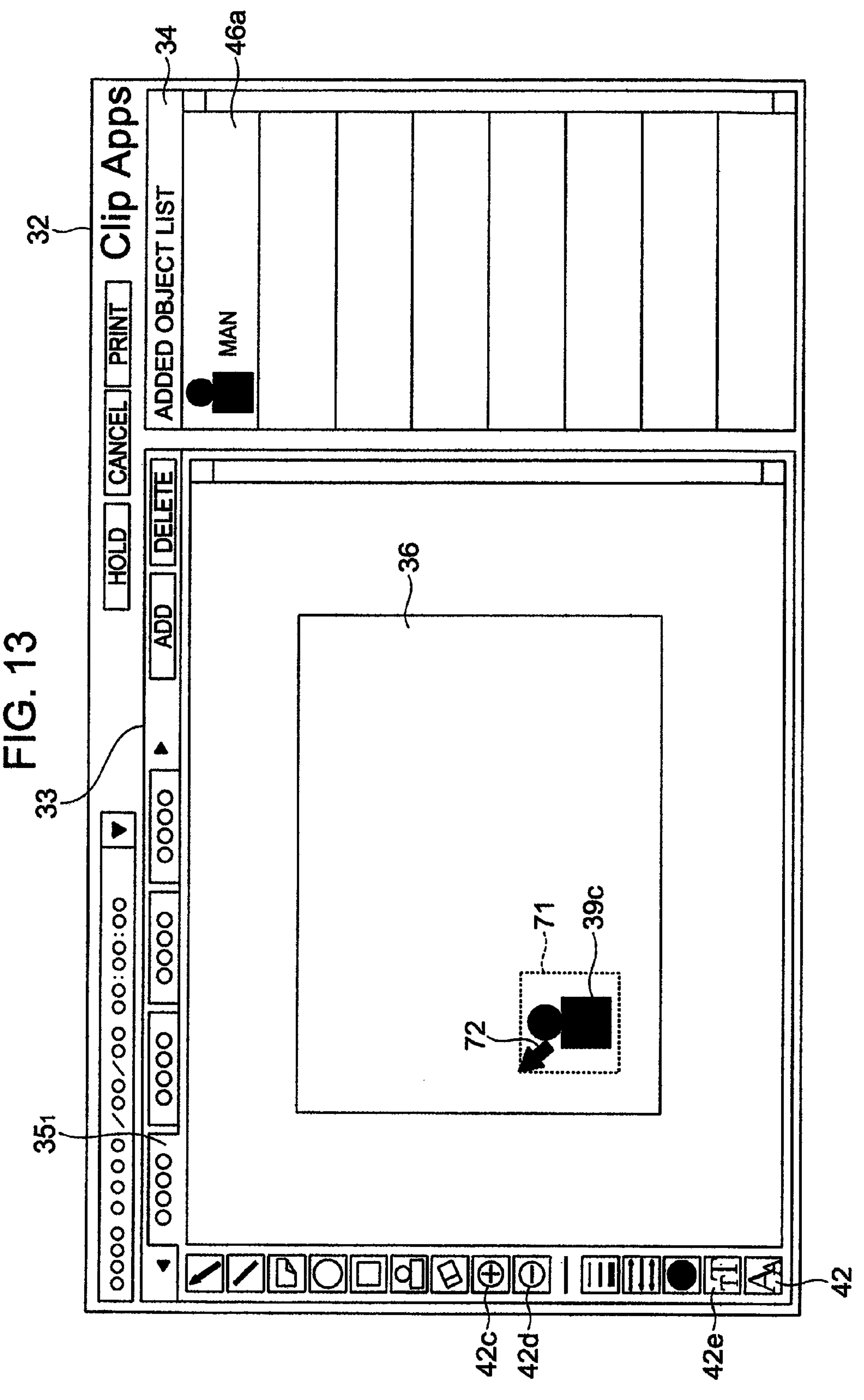
FIG. 13 is a diagram showing a specific example of a document display screen with one symbol icon selected on the symbol icon list screen shown in FIG. 12.

The desired symbol icon 69 on the symbol icon list screen 68, when moved by drag-and-drop to a predetermined position of the tab $\mathbf{35}_1$ in open state (step S110 in FIG. 5), is displayed at the particular position on the symbol icon list screen 68, and as shown in FIG. 13, the symbol 39*c* due to the symbol icon 69 is added to the tab $\mathbf{35}_1$ (step S111 in FIG. 5).

Incidentally, in FIG. 13, numeral 39*c* designates a symbol, numeral 42*c* an enlarged icon, numeral 42*d* a reduced icon, numeral 42*d* a character size change icon, numeral 71 an area frame and numeral 72 an arrow cursor. In FIG. 13, the same component parts as those in the drawings explained above are designated by the same reference numerals, respectively, and not explained again.

In this way, the symbol 39*c* is added to the tab $\mathbf{35}_1$ while at the same time transferring the attribute information (the type, the set position, the display magnification, etc.) for the symbol 39*c* to the Web server 1*a* (FIG. 1). The attribute information thus transferred is registered and managed in the "in-tab plotted object information" $\mathbf{4}d_6$ of the corresponding tab management table 4*d* (FIG. 3) of the data base 1*b* (FIG. 1) (step S112 in FIG. 5) on the one hand, and the object column 46*a* for the symbol 39*c* is set on the added object list screen 34 at the same time.

Also, once the symbol 39*c* is designated, the area frame 71 indicating the rectangular area of the symbol 39*c* and the arrow cursor 72 are displayed on the symbol 39*c*. The arrow cursor 72, though movable by the mouse not shown, is clicked double by the mouse (on the right side). Then, the state of the symbol 39 is established ("Y" in step S113 of FIG. 5), and the process returns to step S104 where the document display screen 32 is displayed as shown in FIG. 8.

Figure 14:
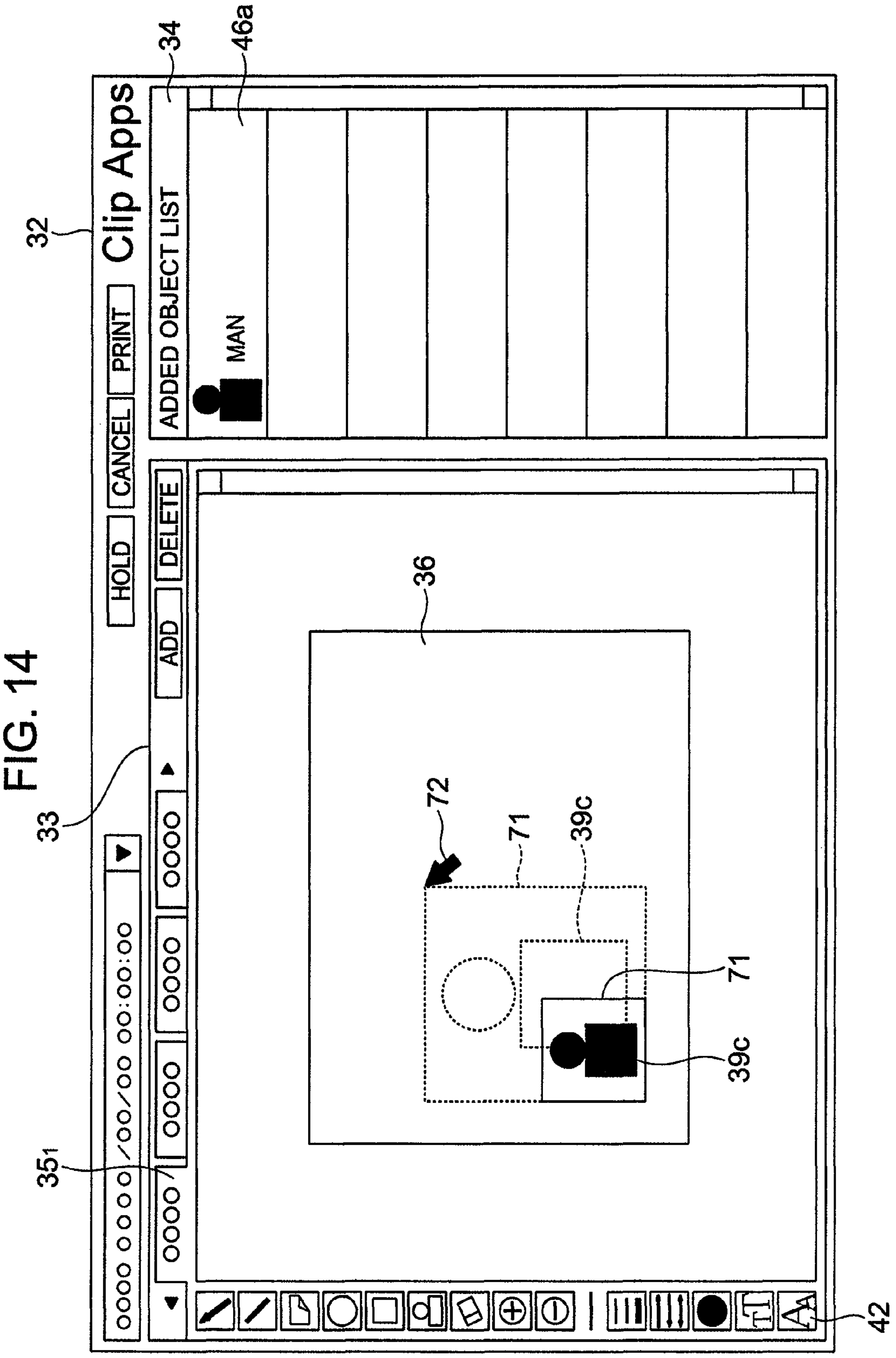
FIG. 14 is a diagram showing the state in which the symbol added is displayed in enlarged form on the document display screen of FIG. 13.

Assume, on the other hand, that the arrow cursor 72 is moved by clicking the mouse after being set at one corner of the area frame 71 (the symbol 39*c* is changed, i.e. "N" in step S113 in FIG. 5). This corner moves together with the arrow cursor 72, and the area frame 71 is enlarged. At the same time, as shown in FIG. 14, the symbol 39*c* is displayed in enlarged form in the area frame 71 thus enlarged (step S114 in FIG. 5). By clicking the mouse double, the state of the symbol 39*c* is established, and the area frame 71 and the arrow frame 72 are erased (step S111 in FIG. 5). The information such as the display magnification (enlargement ratio) of the symbol 39*c* in this state is transferred to the Web server 1*a* (FIG. 1) and registered and managed in the "in-tab plotted object information" $\mathbf{4}d_6$ of the corresponding tab management table 4*d* of the data base 1*b* (FIG. 1) (step S112 in FIG. 5).

The aforementioned operation makes possible the editing job of enlarging or reducing the object. Although the explanation is made above with a symbol as an example, the same applies to other objects such as a comment. In the case where the object is a comment, the character size change icon 42*e* in the object selector 42 is operated. In this way, a character, if small and difficult to visually recognize, can be enlarged and made visible easily.

By the operation described above, the symbol 39 can be newly added to the tab 35 in open state. Also, the desired symbol can be added easily and positively by selecting it from the object selector 42 displayed on the tab 35 and moving the symbol to the desired position on the tab 35. A plot command for other object such as a pattern or an image can also be issued for the add operation through a series of processing steps S110*a* to S114*a* similar to steps S110 to S114 for a symbol. Also, as described above, a comment can be added through a series of processing steps S110*b* to S114*b* similar to steps S110 to S114 for a symbol.

The object selector 42 has an enlarge icon 42*c* and a reduce icon 42*d*. By operating these icons, the whole display area in the tab 35, i.e. the area including the base image 36 and the margin thereof can be enlarged/reduced. An example in which the whole display area is displayed by reducing the base image is shown in FIG. 8. By operating the enlarge icon 42*c*, the display area can be displayed in partially enlarged form.

On the document display screen 32 shown in FIG. 8, assume that the process such as the addition of an object in the open tab $\mathbf{35}_1$ is finished through steps S110 to S114 and it is desired to hold the tab $\mathbf{35}_1$ thus processed in the data base 1*b* of the server 1 (FIG. 1). The "hold" button 43 is operated (step S115 in FIG. 5). As a result, the job (addition of information, generation of a new tab, etc.) on the screen shown in FIG. 8 is held and the process returns to the screen shown in FIG. 7.

Next, step S115 in FIG. 5 is explained with reference to FIG. 15. In FIG. 15, numeral 73 designates a tab holding method select screen, numeral 74 a "new tab generation" check box, numeral 75 a "tab copy" check box, numeral 76 an "OK" button and numeral 77 a "cancel" button. In FIG. 15, the component parts corresponding to those in FIG. 8 are designated by the same reference numerals, respectively, and not explained again.

Figure 15:
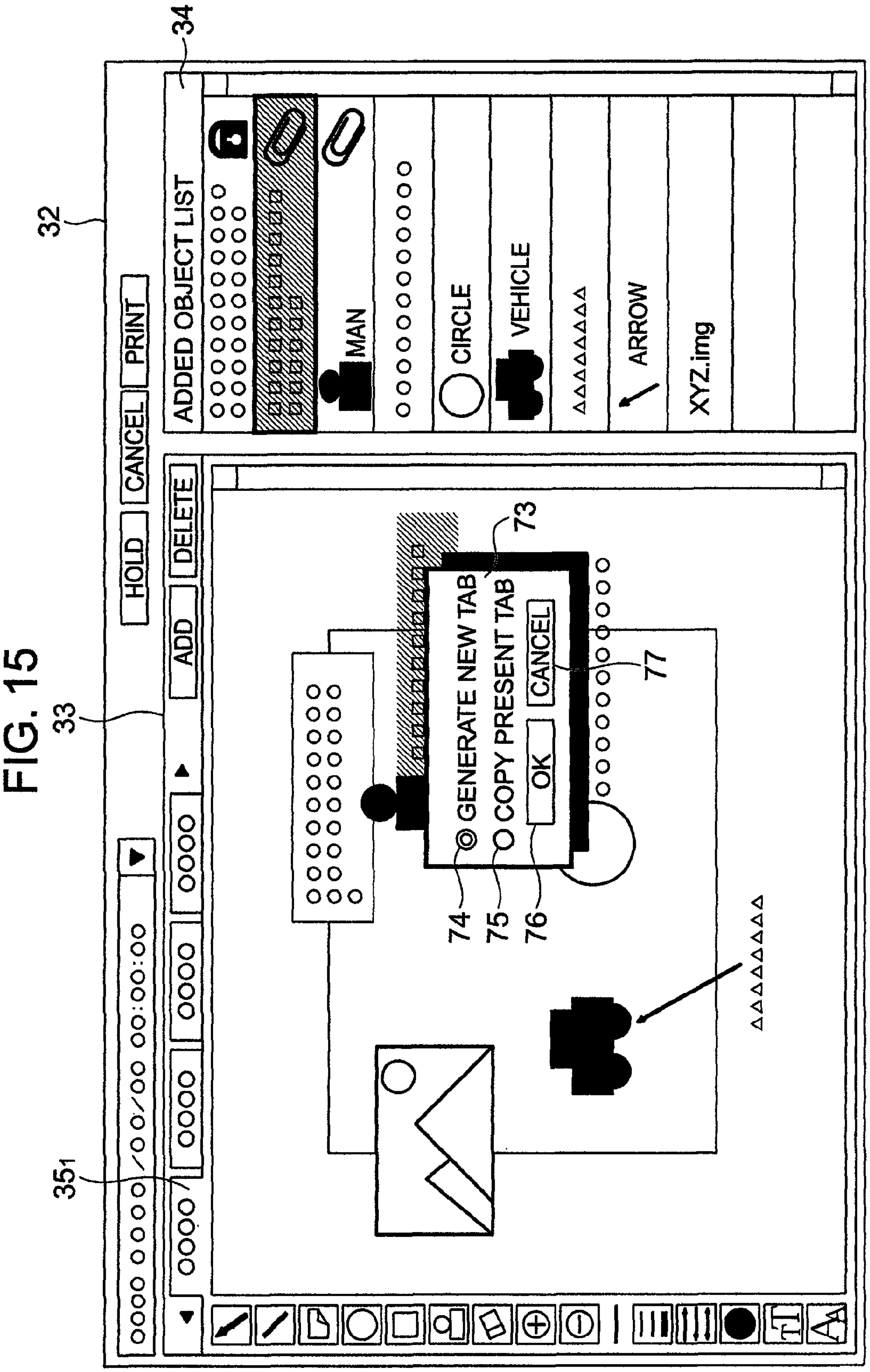
FIG. 15 is a diagram showing a specific example of a tab holding method select screen for holding a tab with an object added thereto as shown in FIG. 8.

On the tab holding method select screen 73 shown in FIG. 15, a new tab can be generated either by a method in which only the base image 36 is copied and held as a new tab 35 (in this case, the original tab $\mathbf{35}_1$ before adding the new object thereto is held as it is) or by a method in which the original tab $\mathbf{35}_1$ containing the entire information added thereto is copied and held as a new tab (in this case, too, the original tab $\mathbf{35}_1$ before adding the new object thereto is held as it is). One of these methods can be selected to hold the tab.

The tab holding method select screen 73 has a "new tab generation" check box 74 for generating a tab to be held as a new tab 35 by copying only the base image 36 and a "tab copy" check box 75 for holding a tab as a new tab 35 by copying the tab containing the entire added information. By selectively checking any one of the check boxes 74 and 75 and selecting the "OK" button 76 on the tab holding method select screen 73, the particular tab is held in the data base 1*b* of the server 1 by the selected method.

In the case where the "new tab generation" check box 74 is selectively checked and the "OK" button 76 operated, a new tab management table 4*d* associated with a predetermined project and document is generated by the Web server 1*a* (FIG. 1) for the tab $\mathbf{35}_1$ shown in FIG. 15, and stored in the data base 1*b*. At the same time, a predetermined data managed by the new tab management table 4*d* is sent to the client PC 2. As a result, the currently open tab 35 with a new object added thereto is changed to a new tab, while the original tab $\mathbf{35}_1$ is closed. Thus, a new tab is added to the document screen 33.

In the case where the "tab copy" check box 75 is selectively checked and the "OK" button 76 operated on the tab holding method select screen 73, on the other hand, the information on the object newly added to the tab $\mathbf{35}_1$ in open state is sent to the Web server 1*a* (FIG. 1). This information is registered and managed in the "in-tab plotted object information" $4d_6$ of the tab management table 4*d* corresponding to the tab $35_1$ in the data base 1*b* (FIG. 1). In this case, therefore, the tab $35_1$ is updated with an object added anew thereto.

Incidentally, upon operation of the "cancel" button 77 on the tab holding method select screen 73, this tab holding method select screen 73 is erased.

As described above, in holding the open tab 35 on the document screen 33 of the document display screen 32 shown in FIG. 8, the tab holding method select screen 73 shown in FIG. 15 is displayed by operating the "hold" button 43, and by further performing the operation described above, the tab 35 can be held as a new tab or the original tab.

Also, in the case where another tab such as the tab $35_3$ is designated on the document screen 33 of the document display screen 32 shown in FIG. 8, this particular tab $35_3$ is opened and becomes viewable in place of the tab $35_1$ thus far displayed (steps S116, S104 in FIG. 5). In this case, the tab $35_1$ is held in the original state, and in the case where a new object is added, the tab $35_1$ is changed to the tab $35_3$ and contains no new object. In order to prevent the added object from being lost, the tab $35_1$ with a new object added thereto is provisionally held in the data base 1*b* (FIG. 1) using the "hold" button 43 and the tab holding method select screen 73, and after that, the tab $35_3$ is designated.

As described above, according to this embodiment, objects such as a comment, a pattern, a symbol, an image and a line can be added to and displayed with the base image on the display screen. Thus, the base image and the objects added can be viewed at the same time. While viewing the base image, therefore, the comment on the base image by each comment author can be checked. Also, a particular part of the base image associated with a particular comment can be confirmed at a glance.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of displaying a document with an image to display information added to a base image of the document on a document screen within a display screen, comprising the steps of:

storing and holding, in a database, information related to the added information including a position at which the information is added on the document screen displaying the base image, a type of added information, a content of the added information, a time when the information is added and an attribute information of an author of the added information;

displaying the added information corresponding to the related information, together with the base image, on a first display area within the display screen as the document with an image in a manner that the added information corresponding to the related information is displayed at the position where the information is added based on the related information on the document screen; and displaying a screen, indicating a list of the information added to the document with an image, on a second display area within the display screen, and wherein either one of the base image and the document with an image is selectively displayed on the first display area by selecting one of tabs respectively associated with the base image and the document with an image.

2. The method of displaying the document with the image according to claim 1, wherein one type of the added information is text information;

wherein by inputting the text information as a search key word, the database is searched for the text information with content of the added information coincident with the input search key word; and wherein the added information obtained by the search is displayed together with the base image at an add position based on the related information on the document screen.

3. The method of displaying the document with the image according to claim 1, wherein the added information includes a symbol, a pattern, a line and an image as objects;

wherein the document screen has an object select section; and wherein the desired object is selected from the select section, and by designating a position of the document screen with the base image on display, the selected object is displayed at the designated position.

4. The method of displaying the document with the image according to claim 3, wherein the added information includes the text information as an object; and wherein a text information select section is selected at the object select section while at the same time designating a predetermined area of the document screen with the base image on display, and by inputting the text information, the input text information is displayed in the designated area of the document screen with the base image on display.

5. The method of displaying the document with the image according to claim 1, wherein the document screen can be printed or edited with the added information.

6. The method of displaying a document with the image according to claim 1, wherein the screen indicating the list of the added information is displayed in order of addition of the information to the document screen.

7. The method of displaying the document with the image according to claim 1, wherein a new tab displayed on the first display area is added each time information added to the base image is added and stored in the database, and the tabs are arranged in order that the tabs have been added on the first display area.

* * * * *